US011542886B2

(12) United States Patent
Kaminaga et al.

(10) Patent No.: US 11,542,886 B2
(45) Date of Patent: Jan. 3, 2023

(54) ENGINE SYSTEM

(71) Applicant: Mazda Motor Corporation, Hiroshima (JP)

(72) Inventors: Takashi Kaminaga, Aki-gun (JP); Tatsuya Fujikawa, Aki-gun (JP); Masahisa Yamakawa, Aki-gun (JP); Naoya Ito, Aki-gun (JP); Ryohei Matsuo, Aki-gun (JP); Yuta Sasaki, Aki-gun (JP); Junki Hori, Aki-gun (JP); Mitsuhiro Muto, Aki-gun (JP); Takuma Fujii, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/452,919

(22) Filed: Oct. 29, 2021

(65) Prior Publication Data

US 2022/0154666 A1 May 19, 2022

(30) Foreign Application Priority Data

Nov. 13, 2020 (JP) .............................. JP2020-189300

(51) Int. Cl.
*F02D 41/40* (2006.01)
*F01L 1/047* (2006.01)
(Continued)

(52) U.S. Cl.
CPC ............ *F02D 41/401* (2013.01); *F01L 1/047* (2013.01); *F01L 13/0036* (2013.01);
(Continued)

(58) Field of Classification Search
CPC ............... F02D 41/401; F02D 13/0207; F02D 2041/389; F02D 2200/021; F02D 2200/101; F01L 1/047; F01L 13/0036; F02P 5/1502
See application file for complete search history.

(56) References Cited

U.S. PATENT DOCUMENTS

| 6,237,562 B1 * | 5/2001 | Awasaka | ............... F02P 5/1504 |
| | | | 123/27 R |
| 2005/0235952 A1* | 10/2005 | Kuzuyama | .......... F02D 13/0215 |
| | | | 123/568.21 |

(Continued)

FOREIGN PATENT DOCUMENTS

JP 2012215098 A 11/2012

*Primary Examiner* — Carl C Staubach
(74) *Attorney, Agent, or Firm* — Alleman Hall Creasman & Tuttle LLP

(57) ABSTRACT

An engine system is provided, including a controller which estimates an intake-valve-closing temperature inside a cylinder. When an engine operates at a given speed and a demanded engine load is a first load or a second load (>the first load), the controller controls so that a mixture gas inside the cylinder combusts by compression ignition, and controls so that, at the first load, the entire mixture gas combusts by compression ignition when the intake-valve-closing temperature is above a first temperature, and at least part of the mixture gas combusts by flame propagation when the intake-valve-closing temperature is below the first temperature, whereas at the second load, the entire mixture gas combusts by compression ignition when the intake-valve-closing temperature is above a second temperature (<the first temperature), and at least part of the mixture gas combusts by flame propagation when the intake-valve-closing temperature is below the second temperature.

8 Claims, 13 Drawing Sheets

(51) Int. Cl.

| | |
|---|---|
| *F01L 13/00* | (2006.01) |
| *F02D 13/02* | (2006.01) |
| *F02D 41/30* | (2006.01) |
| *F02P 5/15* | (2006.01) |
| *F02D 41/38* | (2006.01) |

(52) U.S. Cl.
CPC ...... *F02D 13/0207* (2013.01); *F02D 41/3011* (2013.01); *F02P 5/1502* (2013.01); *F02D 2041/389* (2013.01); *F02D 2200/021* (2013.01); *F02D 2200/101* (2013.01)

(56) References Cited

U.S. PATENT DOCUMENTS

| | | | | |
|---|---|---|---|---|
| 2007/0245818 | A1* | 10/2007 | Matekunas | F02M 45/04 123/299 |
| 2012/0216775 | A1* | 8/2012 | Iwai | F02D 41/402 123/305 |
| 2013/0047958 | A1* | 2/2013 | Yamakawa | F02D 13/0273 60/285 |
| 2014/0283784 | A1* | 9/2014 | Takahashi | F02D 13/0265 123/350 |
| 2019/0145306 | A1* | 5/2019 | Tanaka | F02D 41/0065 123/299 |
| 2019/0186396 | A1* | 6/2019 | Sueoka | F02B 1/10 |
| 2022/0003183 | A1* | 1/2022 | Iida | F02D 35/02 |

* cited by examiner

ENGINE SYSTEM

TECHNICAL FIELD

The present disclosure belongs to a technical field of an engine system.

BACKGROUND OF THE DISCLOSURE

Conventionally, it is known that compression self-ignition combustion (hereinafter, referred to as "CI combustion") improves the thermal efficiency of an engine.

For example, JP2012-215098A discloses an engine which performs the CI combustion, more accurately, HCCI (Homogeneous Charged Compression Ignition) combustion when an engine load is low, and performs SI (Spark Ignition) combustion using a spark plug when the engine load is high. This engine switches the combustion mode corresponding to the change in the engine load. Note that in the SI combustion, a mixture gas combusts by flame propagation after the ignition, and thus, the SI combustion is synonymous with flame propagation combustion in the following description.

Meanwhile, the present inventors conducted a diligent study on the CI combustion. As a result, it became apparent that main control factors of the CI combustion are the temperature of the mixture gas inside a cylinder, and a mass ratio (G/F) of intake air inside the cylinder containing burnt gas to fuel. Moreover, an ignition timing and a combustion period of the CI combustion can be controlled by an in-cylinder temperature at a close timing of an intake valve $T_{IVC}$) and the G/F being adjusted to be a target $T_{IVC}$ and a target G/F. Furthermore, according to the study, the present inventors found that influence of the $T_{IVC}$ is particularly large, and there is a large gap between the $T_{IVC}$ at which the CI combustion of the entire mixture gas is possible, and the $T_{IVC}$ at which the SI combustion is possible.

"SI combustion is possible" corresponds to a state where the combustion stability of the SI combustion meets a standard, and abnormal combustion can be reduced. "CI combustion is possible" corresponds to a state where the combustion stability of the CI combustion meets a standard, and abnormal combustion can be reduced. In the SI combustion, abnormal combustion includes knocking and pre-ignition caused at a high $T_{IVC}$, and in the CI combustion, abnormal combustion includes overly rapid combustion and misfire caused at a low $T_{IVC}$.

Even if the combustion mode is to be switched between the CI combustion and the SI combustion corresponding to the change in the engine load as disclosed in JP2012-215098A, it is difficult to instantly change the $T_{IVC}$ inside the cylinder corresponding to the target combustion mode.

Moreover, according to the study, the present inventors found that the $T_{IVC}$ at which the CI combustion is possible varies according to the engine load. Therefore, even if the engine load is the load at which the CI combustion is possible, the CI combustion is not appropriately performed unless the condition of the $T_{IVC}$ is satisfied. If the CI combustion is not appropriately performed, improving both of the fuel efficiency and combustion stability is impossible.

SUMMARY OF THE DISCLOSURE

The present disclosure is made in view of the above perspectives, and one purpose thereof is to provide an engine system, capable of performing CI (Compression Ignition) combustion according to a load of an engine while improving both of the fuel efficiency and combustion stability.

As a result of a diligent study to solve the above problem, the present inventors found to use a combustion mode which meets a standard of combustion stability and reduces abnormal combustion, according to an estimated in-cylinder temperature ($T_{IVC}$), even when the engine load is a load at which the CI combustion is possible.

According to one aspect of the present disclosure, an engine system including an engine having a cylinder and a piston reciprocatably accommodated in the cylinder, is provided. The system includes an injector attached to the engine and configured to inject fuel into the cylinder, a spark plug attached to the engine and configured to ignite a mixture gas of fuel and intake air, the intake air containing fresh air and burnt gas, a variable valve operating device connected to an intake valve and an exhaust valve, and configured to control opening and closing of the intake valve and the exhaust valve to adjust a filling amount of the intake air, and a controller electrically connected to the injector, the spark plug, and the variable valve operating device, and configured to control the injector, the spark plug, and the variable valve operating device according to a demanded load of the engine. When the engine operates at a given speed and the demanded engine load is a first load or a second load higher than the first load, the controller controls the injector and the spark plug so that the mixture gas inside the cylinder combusts by compression ignition. The controller estimates an intake-valve-closing temperature that is the temperature inside the cylinder at a close timing of the intake valve. While the engine operates at the given speed and the demanded engine load is the first load, when the intake-valve-closing temperature is above a first temperature, the controller controls the injector and the spark plug so that the entire mixture gas inside the cylinder combusts by compression ignition, and when the intake-valve-closing temperature is below the first temperature, the controller controls the injector and the spark plug so that at least part of the mixture gas inside the cylinder combusts by flame propagation. While the engine operates at the given speed and the demanded engine load is the second load, when the intake-valve-closing temperature is above a second temperature lower than the first temperature, the controller controls the injector and the spark plug so that the entire mixture gas inside the cylinder combusts by compression ignition, and when the intake-valve-closing temperature is below the second temperature, the controller controls the injector and the spark plug so that at least part of the mixture gas inside the cylinder combusts by flame propagation.

According to this configuration, when the engine operates at the given speed and the demanded engine load is the first or second load, the mixture gas inside the cylinder can be made to combust by compression ignition. Therefore, the thermal efficiency of the engine and the fuel efficiency can be improved.

Moreover, when the engine operates at the engine speed and the engine load at which the CI combustion is possible, and the intake-valve-closing temperature ($T_{IVC}$) is above the first temperature, the controller controls so that the entire mixture gas inside the cylinder combusts by compression ignition (CI combustion). On the other hand, when the engine operates at the engine speed and the engine load at which the CI combustion is possible, and the $T_{IVC}$ is below the first temperature, the controller controls so that at least part of the mixture gas inside the cylinder combusts by flame propagation (SI (Spark Ignition) combustion).

That is, when the $T_{IVC}$ is below the first temperature, the CI combustion of the entire mixture gas inside the cylinder makes the combustion stability worse. Thus, at least part of the mixture gas combusts by the SI combustion. The SI combustion can stably combust the mixture gas even if the $T_{IVC}$ is low in some degree. Furthermore, since the SI combustion can increase the temperature inside the cylinder, the $T_{IVC}$ can increase early to be above the first temperature so that the entire mixture gas combusts by compression ignition.

Moreover, when the demanded engine load is the second load which is higher than the first load, the combustion mode is switched at the second temperature which is lower than the first temperature. That is, the $T_{IVC}$ (the switching temperature between the combustion mode in which the entire mixture gas inside the cylinder combusts by compression ignition and the combustion mode in which at least part of the mixture gas combusts by flame propagation) is lowered. When the engine load is high, the injection amount of fuel is large in general, which makes the mixture gas comparatively high in fuel concentration. Therefore, even when the $T_{IVC}$ is low, the combustion stability of the CI combustion is enhanced. As a result, the combustion mode can be switched to the CI combustion early, and the fuel efficiency improves.

Therefore, in the engine system capable of performing the CI combustion, the improvement in both fuel efficiency and combustion stability can be achieved.

While the engine operates at the given speed and the demanded engine load is the first load, when the intake-valve-closing temperature is below the first temperature, the controller may actuate the spark plug so that at least part of the mixture gas inside the cylinder combusts by flame propagation, and the remaining mixture gas combusts by compression ignition.

According to this configuration, when the $T_{IVC}$ is low, a so-called SPCCI (SPark Controlled Compression Ignition) combustion is performed, in which the compression ignition is assisted by the spark ignition. That is, when the $T_{IVC}$ is low, while part of the mixture gas combusts by flame propagation, the remaining mixture gas combusts by compression ignition, which further improves combustion stability and fuel efficiency.

While the engine operates at the given speed and the demanded engine load is the first load, when the intake-valve-closing temperature is above the first temperature, the combustion mode may include a first compression ignition combustion mode in which the controller controls the injector to make an injection center of gravity be at a first timing, and inhibits the operation of the spark plug so that the entire mixture gas inside the cylinder combusts by compression ignition, the injection center of gravity being defined based on an injection timing and an injection amount of fuel in one cycle, and a second compression ignition combustion mode in which the controller controls the injector to make the injection center of gravity be at a second timing later than the first timing, and the controller inhibits the operation of the spark plug so that the entire mixture gas inside the cylinder combusts by compression ignition. While the engine operates at the given speed and the demanded engine load is the first load, when the intake-valve-closing temperature is above a third temperature higher than the first temperature, the controller may execute the first compression ignition combustion mode, and when the intake-valve-closing temperature is higher than the first temperature and lower than the third temperature, the controller may execute the second compression ignition combustion mode.

According to this configuration, when the engine operates at the engine speed and the engine load at which the CI combustion is possible, and the $T_{IVC}$ is significantly high, the controller controls the injector to make the injection center of gravity be at the first timing. The first timing is a relatively early timing. By injecting fuel into the cylinder at the early timing, the fuel can be spread using the comparatively strong intake flow, and thus, mixture gas with homogeneous or substantially homogeneous fuel is formed inside the cylinder. Then, the entire mixture gas inside the cylinder combusts by compression ignition (i.e., the HCCI (Homogeneous Charged Compression Ignition) combustion). Since the $T_{IVC}$ is sufficiently high, the combustion stability of the HCCI combustion is enhanced. Note that the injection center of gravity may be defined, for example, by the center of mass of fuel injected all at once or dividedly into a plurality of times in one cycle, with respect to a crank angle.

On the other hand, when the $T_{IVC}$ is higher than the first temperature but lower than the third temperature, the controller controls the spark plug, etc. to execute a combustion mode different from the HCCI combustion. In detail, the controller controls the spark plug to make the injection center of gravity be at the second timing which is relatively late. Note that the injector may inject fuel all at once or dividedly. When the injection center of gravity is relatively late, the fuel supply into the cylinder is delayed, and thus, a period of time from the fuel injection to the ignition becomes shorter. Accordingly, unlike the case where the injection center of gravity is the first timing as described above, the mixture gas inside the cylinder does not become homogeneous. Such inhomogeneous mixture gas can partially form the mixture gas with the high fuel concentration. Therefore, even when the $T_{IVC}$ is slightly low, the entire mixture gas inside the cylinder can combust by compression ignition.

Therefore, in the engine system capable of performing the CI combustion, the improvement in fuel efficiency and combustion stability can be achieved.

A valve lift of the exhaust valve may include a lift curve for the flame propagation combustion and a lift curve for the compression ignition combustion and may be switchable therebetween. In the lift curve for the compression ignition combustion, after the exhaust valve opens during an exhaust stroke and a lift amount of the exhaust valve gradually decreases after the maximum lift, the exhaust valve may maintain a given lift amount until the exhaust valve closes at a given timing during an intake stroke after an intake top dead center.

The variable valve operating device may include an exhaust variable valve lift having a first cam, a second cam, and a switching mechanism between the first cam and the second cam. The first cam may open and close the exhaust valve during an exhaust stroke, and the second cam may open and close the exhaust valve during the exhaust stroke and again opens and closes during an intake stroke.

DETAILED DESCRIPTION OF THE DISCLOSURE

Hereinafter, one embodiment of a method of controlling an engine and an engine system is described with reference to the accompanying drawings. The engine, the engine system, and the control method thereof are merely illustration.

Figure 1:
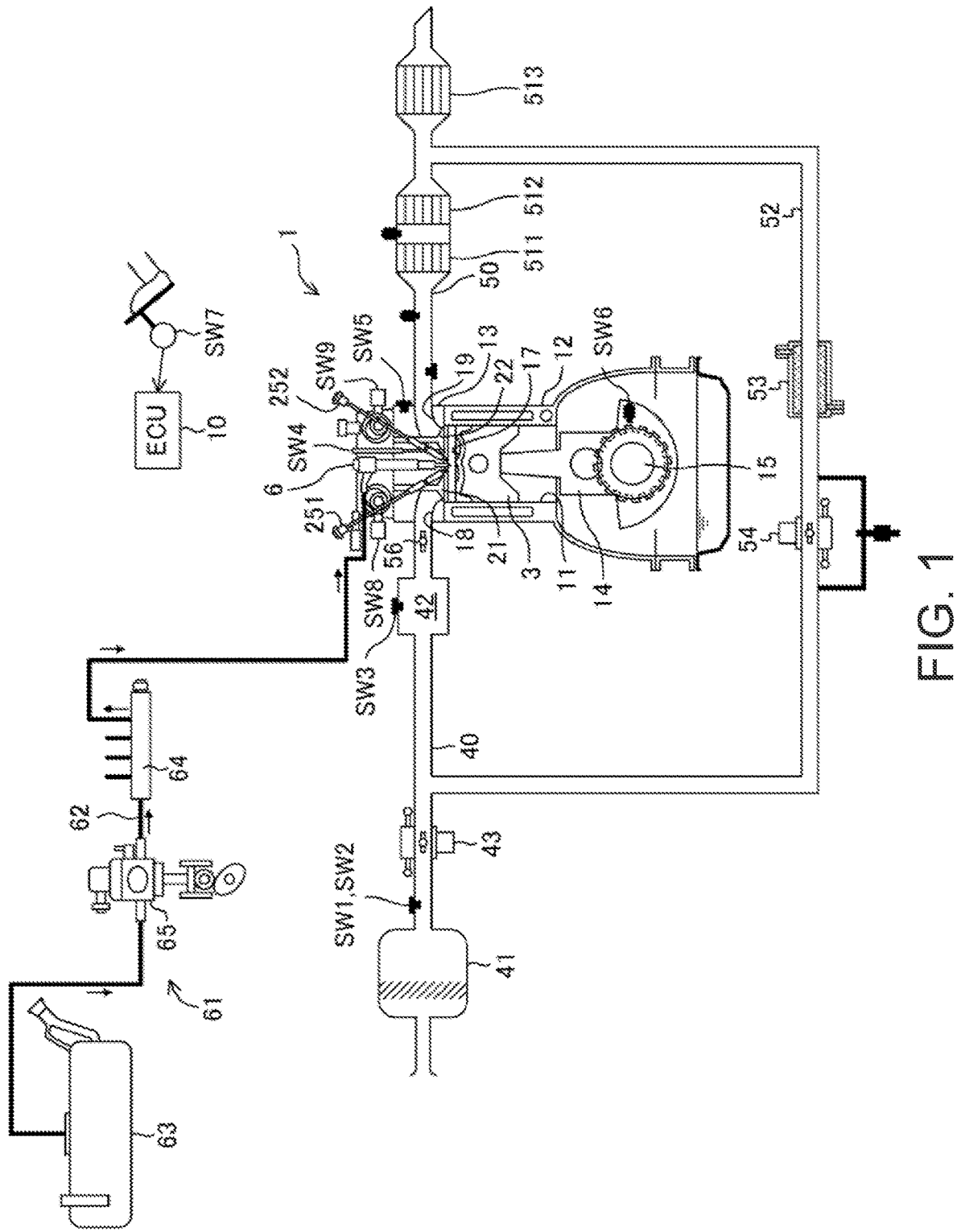
FIG. 1 is a view illustrating an engine system.
Figure 2:
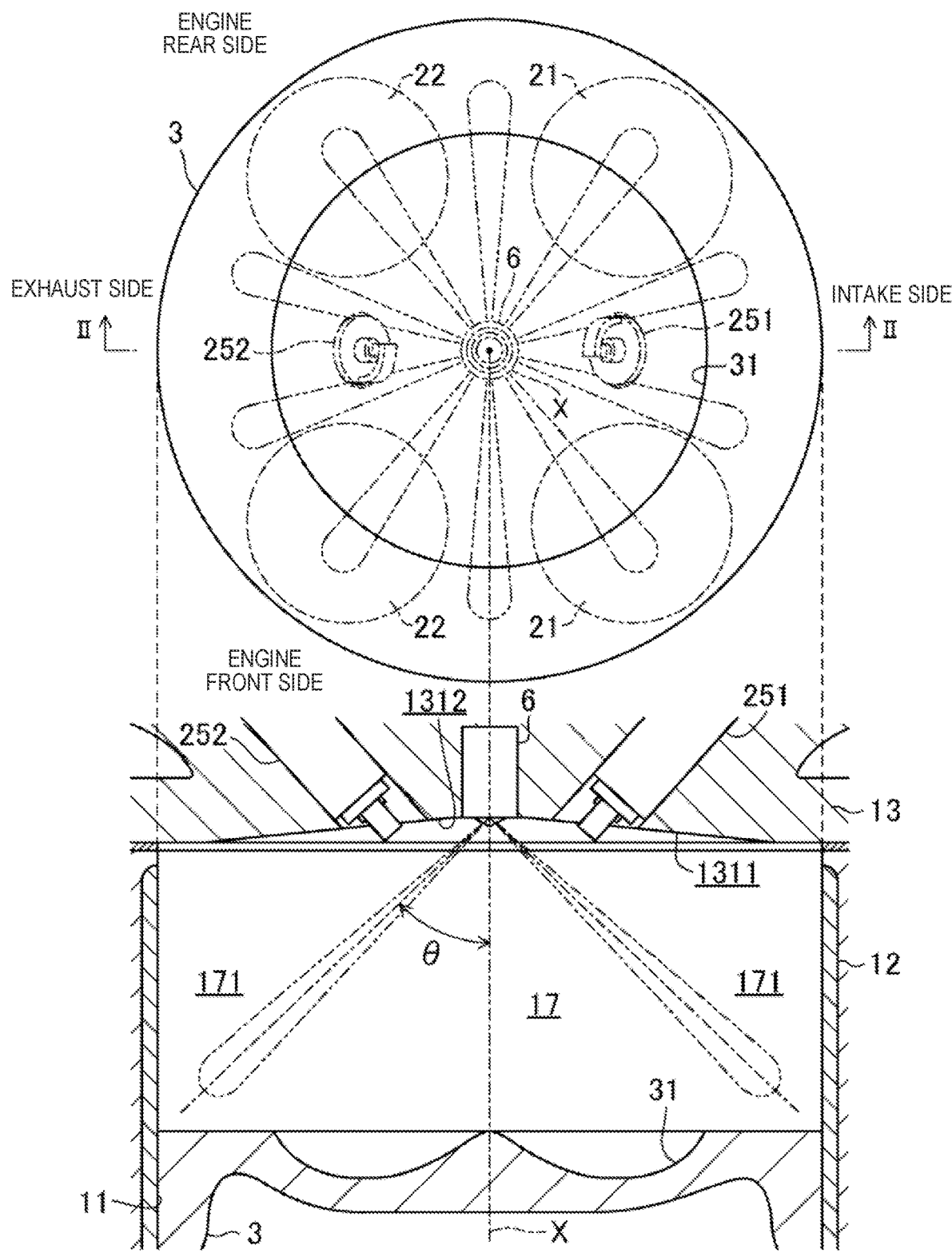
FIG. 2 is a view illustrating a structure of a combustion chamber of an engine, where an upper part of this figure is a plan view of the combustion chamber, and a lower part of this figure is a cross-sectional view taken along a line II-II in the upper part.
Figure 3:
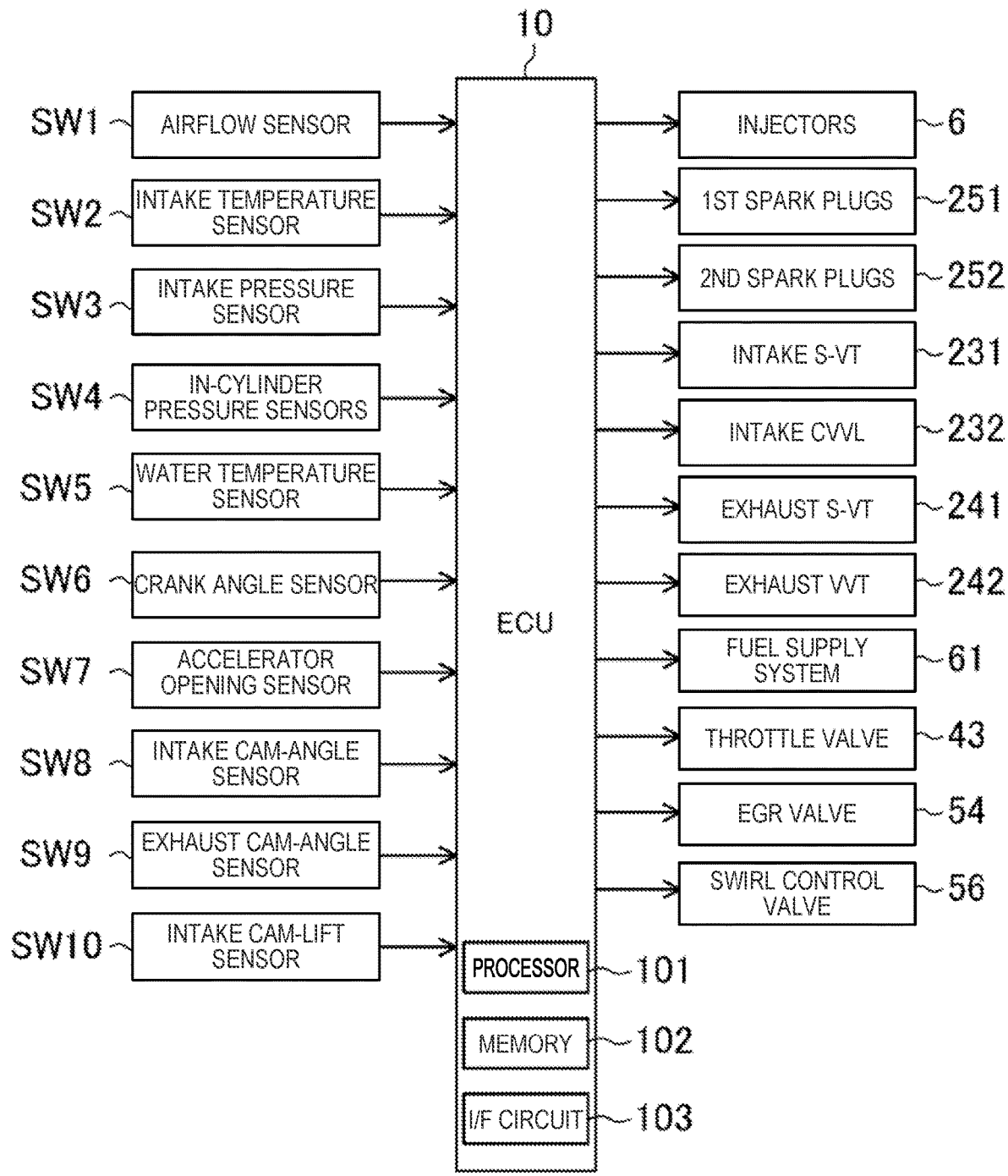
FIG. 3 is a block diagram of the engine system.

FIG. 1 is a view illustrating the engine system. FIG. 2 is a view illustrating a structure of a combustion chamber of the engine. The intake side and the exhaust side illustrated in FIG. 1 are opposite from the intake side and the exhaust side illustrated in FIG. 2. FIG. 3 is a block diagram illustrating a control device for the engine.

The engine system includes an engine 1. The engine 1 includes cylinders 11, and is a four-stroke engine in which an intake stroke, a compression stroke, an expansion stroke, and an exhaust stroke are repeated in each cylinder 11. The engine 1 is mounted on a four-wheeled automobile, and the automobile travels according to the operation of the engine 1. Fuel of the engine 1 is gasoline in this example.

(Configuration of Engine)

The engine 1 is provided with a cylinder block 12 and a cylinder head 13. The cylinder head 13 is placed on the cylinder block 12. A plurality of cylinders 11 are formed inside the cylinder block 12. The engine 1 is a multi-cylinder engine. In FIG. 1, only one cylinder 11 is illustrated.

A piston 3 is inserted into each cylinder 11. The piston 3 is coupled to a crankshaft 15 through a connecting rod 14. The piston 3 reciprocates inside the cylinder 11. The piston 3, the cylinder 11, and the cylinder head 13 define a combustion chamber 17.

As illustrated in the lower part of FIG. 2, a lower surface of the cylinder head 13 (i.e., a ceiling of the cylinder 11) is constituted by a sloped surface 1311 and a sloped surface 1312. The sloped surface 1311 is a slope on a side of an intake valve 21 (described later), and inclines upwardly toward the central part of the ceiling of the cylinder 11. The sloped surface 1312 is a slope on a side of an exhaust valve 22 (described later), and inclines upwardly toward the central part of the ceiling of the cylinder 11. The ceiling of the cylinder 11 is a so-called pentroof-type.

A cavity 31 is formed in a top surface of the piston 3. The cavity 31 is dented from the top surface of the piston 3. The cavity 31 has a shallow dish shape in this example. The central part of the cavity 31 protrudes upwardly, and the protruded part has a substantially conical shape.

A geometric compression ratio of the engine 1 is set to 15:1 or higher, and set to, for example, 30:1 or lower. As will be described later, the engine 1 performs compression ignition (CI) combustion of a mixture gas in part of an operation range of the engine. The CI combustion can be stabilized by a comparatively high geometric compression ratio.

The cylinder head 13 is formed with intake ports 18 for the respective cylinders 11 such that each intake port 18 communicates with the inside of the cylinder 11. Although detailed illustration is omitted, the intake port 18 is a so-called tumble port. That is, the intake port 18 has a shape which generates a tumble flow inside the cylinder 11. The pentroof-type ceiling of the cylinder 11 and the tumble port generate the tumble flow inside the cylinder 11. Note that the intake port 18 includes two intake ports in this example.

Each intake port 18 is provided with the intake valve 21 which opens and closes the intake port 18. A valve operating device is connected to the intake valve 21, and opens and closes the intake valve 21 at a given timing. The valve operating device may be a variable valve operating device which varies a valve timing and/or a valve lift. As illustrated in FIG. 3, the valve operating device includes an intake S-VT (Sequential-Valve Timing) 231 of a hydraulic type or an electric type. The intake S-VT 231 continuously changes a rotational phase of an intake camshaft within a given angle range.

Figure 5:
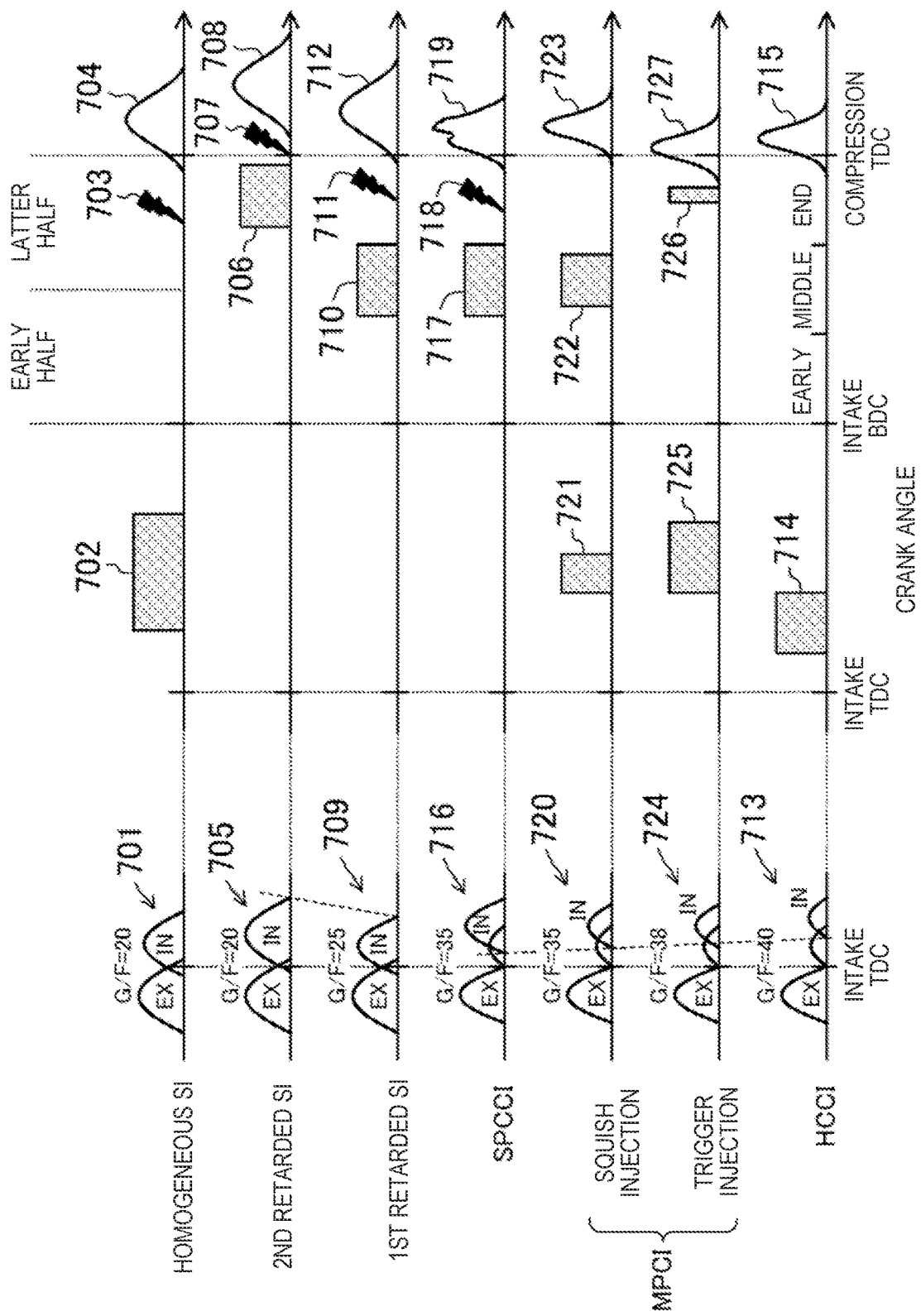
FIG. 5 is a view illustrating open and close operations of an intake valve and an exhaust valve, an injection timing of fuel, and an ignition timing in each combustion mode.

The valve operating device also includes an intake CVVL (Continuously Variable Valve Lift) 232. As illustrated in FIG. 5, the intake CVVL 232 can continuously change the lift amount of the intake valve 21 within a given range. Various known configurations can be adopted for the intake CVVL 232. For example, as disclosed in JP2007-085241A, the intake CVVL 232 may be comprised of a linkage mechanism, a control arm, and a stepping motor. The linkage mechanism reciprocatably pivots a cam which operates the intake valve 21, in an interlocking manner with a rotation of a camshaft. The control arm variably sets a lever ratio of the linkage mechanism. As the lever ratio of the linkage mechanism changes, a pivoting amount of the cam which pushes down the intake valve 21 changes. The stepping motor electrically drives the control arm to change the pivoting amount of the cam, thus changing the lift amount of the intake valve 21.

The cylinder head 13 is formed with exhaust ports 19 for the respective cylinders 11 such that each exhaust port 19 communicates with the inside of the cylinder 11. Note that the exhaust port 19 includes two exhaust ports in this example.

Each exhaust port 19 is provided with the exhaust valve 22 which opens and closes the exhaust port 19. A valve operating device is connected to the exhaust valve 22, and opens and closes the exhaust valve 22 at a given timing. The valve operating device may be a variable valve operating device which varies a valve timing and/or a valve lift. As illustrated in FIG. 3, the valve operating device includes an exhaust S-VT (Sequential-Valve Timing) 241 of a hydraulic type or an electric type. The exhaust S-VT 241 continuously changes a rotational phase of an exhaust camshaft within a given angle range.

The valve operating device also includes an exhaust VVL (Variable Valve Lift) 242. Although illustration is omitted, the exhaust VVL 242 can switch a cam which opens and closes the exhaust valve 22. Various known configurations can be adopted for the exhaust VVL 242. For example, as disclosed in JP2018-168796A, the exhaust VVL 242 may be comprised of a first cam, a second cam, and a switching mechanism which switches between the first cam and the second cam. The first cam opens and closes the exhaust valve 22 during an exhaust stroke. The second cam opens and closes the exhaust valve 22 during the exhaust stroke, and also opens and closes the exhaust valve 22 again during an intake stroke, as illustrated in FIG. 5. The exhaust VVL 242 can change the lift of the exhaust valve 22 by changing the cam to open and close the exhaust valve 22 between the first cam and the second cam.

The intake S-VT 231, the intake CVVL 232, the exhaust S-VT 241, and the exhaust VVL 242 control the opening and closing of the intake valve 21 and the exhaust valve 22 to adjust an amount of fresh air and an amount of burnt gas to be introduced into the cylinder 11. The intake S-VT 231, the intake CVVL 232, the exhaust S-VT 241, and the exhaust VVL 242 adjust a filling amount of intake air.

Injectors 6 are attached to the cylinder head 13 for the respective cylinders 11. As illustrated in FIG. 2, each injector 6 is provided to the central part of the cylinder 11 in the plan view. In detail, the injector 6 is disposed in a valley part of the pentroof where the sloped surface 1311 and the sloped surface 1312 intersect with each other.

The injector 6 directly injects fuel into the cylinder 11. The injector 6 is a multiple nozzle hole type having a plurality of nozzle holes (not illustrated in detail). As illustrated by two-dot chain lines in FIG. 2, the injector 6 injects fuel radially outwardly from the central part to a peripheral part of the cylinder 11. As illustrated in the lower part of FIG. 2, an axis of the nozzle hole of the injector 6 has a given angle θ with respect to a center axis X of the cylinder 11. Although in this example the injector 6 has ten nozzle holes which are disposed at an equal angle in a circumferential direction, the number of nozzle holes and the positions thereof are not particularly limited to this structure.

The injector 6 is connected to a fuel supply system 61. The fuel supply system 61 is comprised of a fuel tank 63 which stores fuel, and a fuel supply passage 62 which couples the fuel tank 63 to the injector 6. A fuel pump 65 and a common rail 64 are interposed in the fuel supply passage 62. The fuel pump 65 pumps fuel to the common rail 64. The fuel pump 65 is a plunger-type pump driven by the crankshaft 15 in this example. The common rail 64 stores at a high fuel pressure the fuel pumped from the fuel pump 65. When the injector 6 is valve-opened, the fuel stored in the common rail 64 is injected into the cylinder 11 from the nozzle holes of the injector 6. The pressure of the fuel supplied to the injector 6 may be changed according to the operating state of the engine 1. Note that the configuration of the fuel supply system 61 is not limited to the configuration described above.

A first spark plug 251 and a second spark plug 252 are attached to the cylinder head 13 for each cylinder 11. Each of the first spark plug 251 and the second spark plug 252 forcibly ignites the mixture gas inside the cylinder 11. As illustrated in FIG. 2, the first spark plug 251 is disposed between the two intake valves 21, and the second spark plug 252 is disposed between the two exhaust valves 22. A tip end of the first spark plug 251 and a tip end of the second spark plug 252 are located near the ceiling of the cylinder 11 on the intake side and the exhaust side of the injector 6, respectively. Note that only one spark plug may be provided.

The engine 1 is connected at one side surface to an intake passage 40. The intake passage 40 communicates with the intake ports 18 of the cylinders 11. Air to be introduced into the cylinders 11 flows through the intake passage 40. The intake passage 40 is provided at its upstream-end part with an air cleaner 41. The air cleaner 41 filters the air. The intake passage 40 is provided, near its downstream end, with a surge tank 42. Part of the intake passage 40 downstream of the surge tank 42 constitutes independent passages branching for the respective cylinders 11. Downstream ends of the independent passages are connected to the intake ports 18 of the cylinders 11, respectively.

The intake passage 40 is provided, between the air cleaner 41 and the surge tank 42, with a throttle valve 43. The throttle valve 43 adjusts its opening to control an amount of air to be introduced into the cylinder 11. Basically, the throttle valve 43 is fully opened during the operation of the engine 1. The introducing amount of air is controlled by the variable valve operating device described above.

The engine 1 is provided with a swirl generator which generates a swirl flow inside the cylinders 11. The swirl generator has a swirl control valve 56 attached to the intake passage 40. Although not illustrated in detail, the intake passage 40 includes a primary passage and a secondary passage, which are connected to each cylinder 11 downstream of the surge tank 42 corresponding to the two intake ports 18, and the swirl control valve 56 is provided to the secondary passage. The swirl control valve 56 is an opening control valve which is capable of choking a cross-section of the secondary passage. When the opening of the swirl control valve 56 is small, a flow rate of intake air flowing into the cylinder 11 from the primary passage is relatively large while a flow rate of intake air flowing into the cylinder 11 from the secondary passage is relatively small, which increases the swirl flow inside the cylinder 11. On the other hand, when the opening of the swirl control valve 56 is large, the flow rate of intake air flowing into the cylinder 11 from the primary passage and the flow rate of intake air flowing from the secondary passage are substantially equal, which reduces the swirl flow inside the cylinder 11. When the swirl control valve 56 is fully opened, the swirl flow is not generated.

The engine 1 is connected at the other side surface to an exhaust passage 50. The exhaust passage 50 communicates with the exhaust ports 19 of the cylinders 11. The exhaust passage 50 is a passage through which exhaust gas discharged from the cylinders 11 flows. Although detailed illustration is omitted, an upstream part of the exhaust passage 50 constitutes independent passages branching for the respective cylinders 11. Upstream ends of the independent passages are connected to the exhaust ports 19 of the cylinders 11, respectively.

The exhaust passage 50 is provided with an exhaust gas purification system having a plurality of catalytic converters. An upstream catalytic converter includes, for example, a three-way catalyst 511 and a GPF (Gasoline Particulate Filter) 512. A downstream catalytic converter includes a three-way catalyst 513. Note that the exhaust gas purification system is not limited to the illustrated configuration. For example, the GPF may be omitted. Moreover, the catalytic converter is not limited to the one including the three-way catalyst. Furthermore, the disposed order of the three-way catalyst and the GPF may be changed suitably.

An exhaust gas recirculation (EGR) passage 52 is connected between the intake passage 40 and the exhaust passage 50. The EGR passage 52 is a passage through which a part of exhaust gas recirculates to the intake passage 40. An upstream end of the EGR passage 52 is connected to part of the exhaust passage 50 between the upstream and downstream catalytic converters. A downstream end of the EGR passage 52 is connected to a part of the intake passage 40 between the throttle valve 43 and the surge tank 42.

The EGR passage 52 is provided with an EGR cooler 53 of a water-cooled type. The EGR cooler 53 cools exhaust gas. The EGR passage 52 is also provided with an EGR valve 54. The EGR valve 54 adjusts a flow rate of exhaust gas flowing through the EGR passage 52. The EGR valve 54 changes its opening to adjust a recirculating amount of the cooled exhaust gas.

As illustrated in FIG. 3, the control device for the engine 1 is provided with an ECU (engine control unit) 10 to operate the engine 1. The ECU 10 is a controller based on a well-known microcomputer, and includes a processor (e.g., a central processing unit (CPU)) 101 which executes a program, memory 102 which is comprised of, for example, RAM (Random Access Memory) and/or ROM (Read Only Memory) and stores the program and data, and an interface (I/F) circuit 103 which outputs and inputs an electric signal. The ECU 10 is one example of a "controller."

As illustrated in FIGS. 1 and 3, various kinds of sensors SW1-SW10 are connected to the ECU 10. The sensors SW1-SW10 output signals to the ECU 10. The sensors include the following sensors. An airflow sensor SW1 is provided to the intake passage 40 downstream of the air cleaner 41, and measures the flow rate of air flowing through the intake passage 40. An intake temperature sensor SW2 is provided to the intake passage 40 downstream of the air cleaner 41, and measures the temperature of the air flowing through the intake passage 40. An intake pressure sensor SW3 is attached to the surge tank 42, and measures the pressure of the air to be introduced into the cylinder 11. An in-cylinder pressure sensor SW4 is attached to the cylinder head 13 for each cylinder 11, and measures the pressure inside the cylinder 11. A water temperature sensor SW5 is attached to the engine 1, and measures the temperature of coolant. A crank angle sensor SW6 is attached to the engine 1, and measures a rotational angle of the crankshaft 15. An accelerator opening sensor SW7 is attached to an accelerator pedal mechanism, and measures an accelerator opening corresponding to an operation amount of an accelerator pedal. An intake cam-angle sensor SW8 is attached to the engine 1, and measures a rotational angle of the intake camshaft. An exhaust cam-angle sensor SW9 is attached to the engine 1, and measures a rotational angle of the exhaust camshaft. An intake cam-lift sensor SW10 is attached to the engine 1, and measures the lift amount of the intake valves 21.

The ECU 10 determines the operating state of the engine 1 based on the signals of the sensors SW1-SW10, and also calculates a control amount of each device based on a control logic set in advance. The control logic is stored in the memory 102. The control logic includes calculating a target amount and/or the control amount by using a map stored in the memory 102.

The ECU 10 outputs electric signals related to the calculated control amounts to the injector 6, the first spark plug 251, the second spark plug 252, the intake S-VT 231, the intake CVVL 232, the exhaust S-VT 241, the exhaust VVL 242, the fuel supply system 61, the throttle valve 43, the EGR valve 54, and the swirl control valve 56.

(Operation Control Map of Engine)

Figure 4:
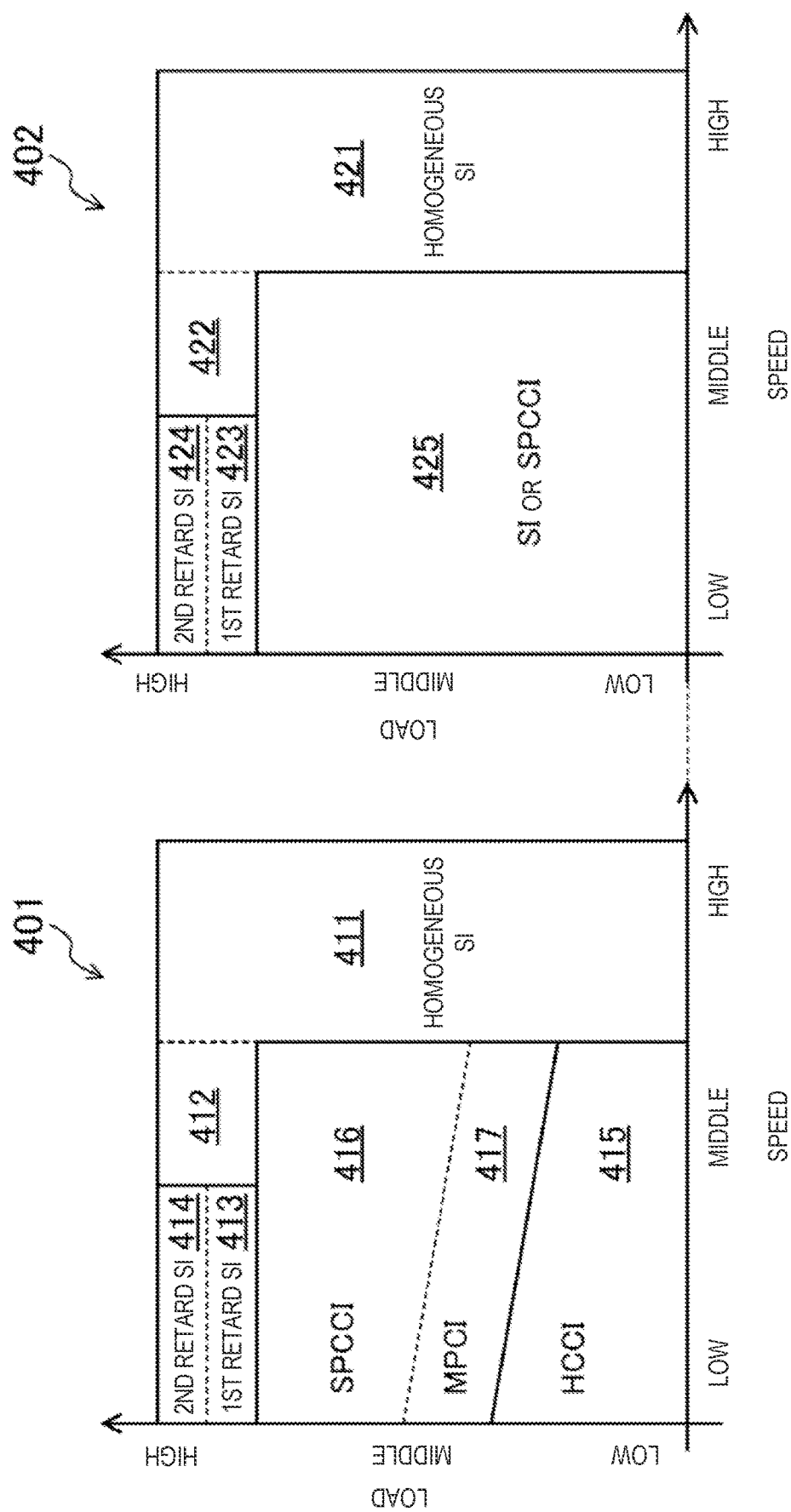
FIG. 4 is a view illustrating a base map related to operation of the engine.

FIG. 4 illustrates a base map related to the control of the engine 1. The base map is stored in the memory 102 of the ECU 10. The base map includes a first base map 401 and a second base map 402. The ECU 10 uses, for controlling the engine 1, the base map which is selected from the two base maps based on the temperature (high or low) of the coolant of the engine 1. The first base map 401 is a base map when the engine 1 is warm (warm state), and the second base map 402 is a base map when the engine 1 is cold (cold state).

The first base map 401 and the second base map 402 are defined based on a load and a speed of the engine 1. The first base map 401 is roughly divided into four ranges, a first range, a second range, a third range, and a fourth range, according to the load and speed. In more detail, the first range includes a high-speed range 411, and a high-load/middle-speed range 412. The high-speed range 411 covers from a low-load range to a high-load range. The second range corresponds to high-load/low-speed ranges 413 and 414. The third range corresponds to a low-load range 415 including idling operation, and covers from a low-speed range to a middle-speed range. The fourth range corresponds to middle-load ranges 416 and 417 where the load is higher than the low-load range 415, and lower than the high-load/middle-speed range 412 and the high-load/low-speed ranges 413 and 414.

The high-load/low-speed ranges 413 and 414 are comprised of a first high-load/low-speed range 413, and a second high-load/low-speed range 414 at a load higher than the first high-load/low-speed range 413 and including the maximum load. The middle-load ranges 416 and 417 are comprised of a first middle-load range 416, and a second middle-load range 417 at a load lower than the first middle-load range 416.

The second base map 402 is divided into three ranges, a first range, a second range, and a third range. In more detail, the first range includes a high-speed range 421 and a high-load/middle-speed range 422. The second range corresponds to high-load/low-speed ranges 423 and 424. The third range corresponds to a low-and-middle load range 425 covering, in the load direction, from a low-load range including the idling operation to a middle-load range, and in the speed direction, from a low-speed range to a middle-speed range.

The high-load/low-speed ranges 423 and 424 are comprised of a first high-load/low-speed range 423 at a relatively low load, and a second high-load/low-speed range 424 at a load higher than the first high-load/low-speed range 423 and including the maximum load.

The first range of the second base map 402 corresponds to the first range of the first base map 401, the second range of the second base map 402 corresponds to the second range of the first base map 401, and the third range of the second base map 402 corresponds to the third range and the fourth range of the first base map 401.

Here, the low-speed range, the middle-speed range, and the high-speed range may correspond to a low-speed range, a middle-speed range, and a high-speed range when the entire operation range of the engine 1 is substantially equally divided in the speed direction into three, respectively.

Moreover, the low-load range, the middle-load range, and the high-load range may correspond to a low-load range, a middle-load range, and a high-load range when the entire operation range of the engine 1 is substantially equally divided in the load direction into three, respectively.

(Combustion Mode of Engine)

Next, the operation of the engine 1 in each range is described in detail. The ECU 10 changes the open and close operations of the intake valve 21 and the exhaust valve 22, the injection timing of fuel, and whether or not to perform the ignition, according to a demanded load and the speed of the engine 1. A combustion mode of the mixture gas inside the cylinder 11 is changed by the filling amount of intake air, the injection timing of fuel, and whether or not to perform the ignition being changed. The combustion mode of the engine 1 changes between homogeneous SI combustion, retarded SI combustion, HCCI (Homogeneous Charged Compression Ignition) combustion, SPCCI (SPark Controlled Compression Ignition) combustion, and MPCI (Multiple Premixed fuel injection Compression Ignition) combustion. FIG. 5 illustrates the open and close operations of the intake valve 21 and the exhaust valve 22, the injection timing of fuel, the ignition timing, and a waveform of a heat release rate which is generated inside the cylinder 11 by the combustion of the mixture gas in each combustion mode. In FIG. 5, a crank angle progresses from left to right. Below, each combustion mode in the warm state of the engine 1 is described as one example.

1. Homogeneous SI Combustion

When the engine 1 operates in the first range (i.e., in the high-speed range 411 or the high-load/middle-speed range 412), the ECU 10 combusts the mixture gas inside the cylinder 11 by flame propagation. In more detail, the intake S-VT 231 sets the open and close timings of the intake valve 21 to given timings. The intake CVVL 232 sets the lift amount of the intake valve 21 to a given lift amount. The lift amount of the intake valve 21 is substantially the same as the lift amount of the exhaust valve 22 (described later). The exhaust S-VT 241 sets the open and close timings of the exhaust valve 22 to given timings. The intake valve 21 and the exhaust valve 22 both open near an intake top dead center (TDC) (see 701). The exhaust VVL 242 opens and closes the exhaust valve 22 only once. According to this open-and-close mode of the intake valve 21 and the exhaust valve 22, a comparatively large amount of fresh air, and a comparatively small amount of burnt gas are introduced into the cylinder 11. Basically, the burnt gas is internal EGR gas which remains inside the cylinder 11.

The injector 6 injects fuel into the cylinder 11 during an intake stroke (see 702). The injector 6 may inject fuel all at once as illustrated in FIG. 5. The fuel injected into the cylinder 11 is spread by a strong intake flow, and the mixture gas at a homogeneous fuel concentration is formed inside the cylinder 11. A mass ratio of the mixture gas (i.e., a mass ratio G/F of intake air inside the cylinder 11 containing burnt gas to fuel) is about 20:1. Note that a mass ratio A/F of fresh air inside the cylinder 11 to fuel is a stoichiometric air fuel ratio.

The first spark plug 251 and the second spark plug 252 are both actuated to ignite the mixture gas near a compression TDC (see 703). The first spark plug 251 and the second spark plug 252 may ignite the mixture gas simultaneously or at different timings.

After the ignition by the first spark plug 251 and the second spark plug 252, the mixture gas combusts by flame propagation (see 704). In the high-speed range 411 where the speed is too high for the CI combustion, and in the high-load/middle-speed range 412 where the load is too high for the CI combustion, the engine 1 can operate while securing combustion stability and reducing abnormal combustion.

Since the homogeneous mixture gas is combusted by jump spark ignition in this combustion mode, this mode may be referred to as the "homogeneous SI combustion."

2. Retarded SI Combustion

When the engine 1 operates in the second range (i.e., in the first high-load/low-speed range 413 or the second high-load/low-speed range 414), the ECU 10 combusts the mixture gas inside the cylinder 11 by flame propagation. In more detail, when the engine 1 operates in the second high-load/low-speed range 414, the intake S-VT 231 sets the open and close timings of the intake valve 21 to given timings. The intake CVVL 232 sets the lift amount of the intake valve 21 to a given lift amount. The lift amount of the intake valve 21 is substantially the same as the lift amount of the exhaust valve 22 (described later). The exhaust S-VT 241 sets the open and close timings of the exhaust valve 22 to given timings. The intake valve 21 and the exhaust valve 22 both open near the intake TDC (see 705). The exhaust VVL 242 opens and closes the exhaust valve 22 only once. According to this open-and-close mode of the intake valve 21 and the exhaust valve 22, a comparatively large amount of fresh air, and a comparatively small amount of burnt gas are introduced into the cylinder 11. Basically, the burnt gas is the internal EGR gas which remains inside the cylinder 11. The G/F is about 20:1.

When the engine 1 operates in the first high-load/low-speed range 413, the intake S-VT 231 sets the open and close timings of the intake valve 21 to given timings. The intake CVVL 232 sets the lift amount of the intake valve 21 to be smaller than the lift amount in the second high-load/low-speed range 414. The close timing of the intake valve 21 in the first high-load/low-speed range 413 is advanced from the close timing in the second high-load/low-speed range 414 (see 709). The exhaust S-VT 241 sets the open and close timings of the exhaust valve 22 to given timings. The intake valve 21 and the exhaust valve 22 both open near the intake TDC. The exhaust VVL 242 opens and closes the exhaust valve 22 only once. According to this open-and-close mode of the intake valve 21 and the exhaust valve 22, the amount of fresh air introduced into the cylinder 11 decreases and the amount of burnt gas increases, compared to the mode in the second high-load/low-speed range 414. The G/F in the first high-load/low-speed range 413 is about 25:1, which is leaner than the G/F in the second high-load/low-speed range 414.

Since the load is high and the speed is low in the first high-load/low-speed range 413 and the second high-load/low-speed range 414, abnormal combustion (e.g., preignition and knocking) easily occurs. The injector 6 injects fuel into the cylinder 11 during the compression stroke (see 706 and 710). By retarding the timing of injecting fuel into the cylinder 11, abnormal combustion can be reduced. The injector 6 may inject fuel all at once as illustrated in FIG. 5.

In the second high-load/low-speed range 414 where the load is relatively high, the injector 6 injects fuel into the cylinder 11 at a relatively late timing (see 706). The injector 6 may inject fuel, for example, in a latter half of the combustion stroke or an end period of the compression stroke. Note that the latter half of the compression stroke corresponds to a latter half when the compression stroke is equally divided into two, an early half and a latter half. The end period of the compression stroke corresponds to an end period when the compression stroke is equally divided into three, an early period, a middle period, and an end period. In the second high-load/low-speed range 414 where the load is relatively high, retarding the injection timing of fuel is advantageous to reduce abnormal combustion.

In the first high-load/low-speed range 413 where the load is relatively low, the injector 6 injects fuel into the cylinder 11 at a relatively early timing (see 710). The injector 6 may inject fuel, for example, in the middle period of the compression stroke. The middle period of the compression stroke corresponds to the middle period when the compression stroke is equally divided into three, the early period, the middle period, and the end period.

The fuel injected into the cylinder 11 during the compression stroke is spread by the injection flow. An injection pressure of fuel is preferred to be higher in order to rapidly combust the mixture gas so that abnormal combustion is reduced and combustion stability is improved. The high injection pressure generates a strong flow inside the cylinder 11 at a high pressure near the compression TDC. The strong flow accelerates the flame propagation.

The first spark plug 251 and the second spark plug 252 both ignite the mixture gas near the compression TDC (see 707 and 711). The first spark plug 251 and the second spark plug 252 may ignite the mixture gas simultaneously or at different timings. In the second high-load/low-speed range 414 where the load is relatively high, the first spark plug 251 and the second spark plug 252 perform the ignition at a timing later than the compression TDC in accordance with the retarded injection timing of fuel. After the ignition by the first spark plug 251 and the second spark plug 252, the mixture gas combusts by flame propagation (see 708 and 712).

When the engine 1 is in the operating state where the speed is low and abnormal combustion easily occurs, the engine 1 can operate while securing combustion stability and reducing abnormal combustion. Since the injection timing is retarded in this combustion mode, this combustion mode may be referred to as the "retarded SI combustion." Specifically, the combustion mode in the first high-load/low-speed range 413 may be referred to as a "first retarded SI combustion," and the combustion mode in the second high-load/low-speed range 414 may be referred to as a "second retarded SI combustion."

3. HCCI Combustion

When the engine 1 operates in the third range (i.e., in the low-load range 415), the ECU 10 combusts the mixture gas inside the cylinder 11 by compression ignition. In more detail, when the engine 1 operates in the low-load range 415, the exhaust VVL 242 opens and closes the exhaust valve 22 twice. That is, the exhaust VVL 242 switches the first cam to/from the second cam according to the change in the operation range between the first range and the second range, and the third range. The exhaust valve 22 is opened and closed during the exhaust stroke, and opened and closed also during the intake stroke. The exhaust S-VT 241 sets the open and close timings of the exhaust valve 22 to given timings. The intake S-VT 231 retards the open and close timings of the intake valve 21. The intake CVVL 232 sets the lift amount of the intake valve 21 to be small. The intake valve 21 is closed at the most retarded timing (see 713).

According to this open-and-close mode of the intake valve 21 and the exhaust valve 22, a comparatively small amount of fresh air and a large amount of burnt gas are introduced into the cylinder 11. Basically, the burnt gas is the internal EGR gas which remains inside the cylinder 11. The G/F of the mixture gas is about 40:1. The large amount of internal EGR gas introduced into the cylinder 11 increases the in-cylinder temperature.

The injector 6 injects fuel into the cylinder 11 during the intake stroke (see 714). As described above, the fuel is spread by the strong intake flow, and the homogeneous mixture gas is formed inside the cylinder 11. The injector 6 may inject fuel all at once as illustrated in FIG. 5. Alternatively, the injector 6 may inject fuel dividedly (split injection).

When the engine 1 operates in the low-load range 415, the first spark plug 251 and the second spark plug 252 do not perform the ignition. The mixture gas inside the cylinder 11 is compressed and ignited near the compression TDC (see 715). Since the load of the engine 1 is low and the fuel amount is small, by making the G/F lean, the CI combustion (more accurately, the HCCI combustion) can be achieved while abnormal combustion is reduced. Moreover, by introducing a large amount of internal EGR gas and increasing the in-cylinder temperature, the stability of the HCCI combustion and thermal efficiency of the engine 1 improve. The HCCI combustion corresponds to a "first compression ignition combustion mode."

4. SPCCI Combustion

When the engine 1 operates in the fourth range (in detail, in the first middle-load range 416), the ECU 10 combusts part of mixture gas inside the cylinder 11 by flame propagation, and combusts the remaining mixture gas by compression ignition. In more detail, the exhaust S-VT 241 sets the open and close timings of the exhaust valve 22 to given timings. The exhaust VVL 242 opens and closes the exhaust valve 22 twice (see 716). Internal EGR gas is introduced into the cylinder 11. The intake CVVL 232 sets the lift amount of the intake valve 21 to be larger than the lift amount in the low-load range 415. The close timing of the intake valve 21 is substantially the same as the close timing in the low-load range 415. The open timing of the intake valve 21 is advanced from the open timing in the low-load range 415. According to this open-and-close mode of the intake valve 21 and the exhaust valve 22, the amount of fresh air introduced into the cylinder 11 increases and the introducing amount of burnt gas decreases. The G/F of the mixture gas is 35:1, for example.

The injector 6 injects fuel into the cylinder 11 during the compression stroke (see 717). The injector 6 may perform the injection all at once as illustrated in FIG. 5. Similarly to the retarded SI combustion, retarding the fuel injection is advantageous to reduce abnormal combustion. Note that for example, when the engine 1 operates at a low load in the first middle-load range 416, fuel may be injected during each of the intake stroke and the compression stroke.

The first spark plug 251 and the second spark plug 252 both ignite the mixture gas near the compression TDC (see 718). The mixture gas starts the flame propagation combustion near the compression TDC after the ignition by the first spark plug 251 and the second spark plug 252. The heat generated by the flame propagation combustion increases the temperature inside the cylinder 11, and the flame propagation increases the pressure inside the cylinder 11. Accordingly, unburnt mixture gas self-ignites, for example, after the compression TDC, and starts the CI combustion. After the start of the CI combustion, the flame propagation combustion and the CI combustion progress in parallel. The waveform of the heat release rate may have two peaks as illustrated in FIG. 5 (see 719).

Variations in the temperature inside the cylinder 11 before the start of the compression can be reduced by controlling the heat release amount in the flame propagation combustion. The heat release amount in the flame propagation combustion can be adjusted by the ECU 10 controlling the ignition timing. Accordingly, the mixture gas self-ignites at a target timing. In the SPCCI combustion, the ECU 10 controls the timing of the compression ignition by controlling the ignition timing. Since the spark ignition controls the compression ignition in this combustion mode, this combustion mode may be referred to as the "SPark Controlled Compression Ignition (SPCCI) combustion."

5. MPCI Combustion

When the engine 1 operates in the second middle-load range 417, the ECU 10 combusts the mixture gas inside the cylinder 11 by compression ignition. In more detail, the exhaust S-VT 241 sets the open and close timings of the exhaust valve 22 to given timings. The exhaust VVL 242 opens and closes the exhaust valve 22 twice. Internal EGR gas is introduced into the cylinder 11. The intake CVVL 232 sets the lift amount of the intake valve 21 to be smaller than the lift amount in the first middle-load range 416. The close timing of the intake valve 21 is substantially the same as the close timing in the first middle-load range 416. The open timing of the intake valve 21 is retarded from the open timing in the first middle-load range 416 (see 720 and 724). According to this open-and-close mode of the intake valve 21 and the exhaust valve 22, the amount of fresh air introduced into the cylinder 11 decreases and the introducing amount of burnt gas increases. The G/F of the mixture gas is between 35:1 and 38:1, for example.

The injector 6 injects fuel into the cylinder 11 during each of the intake stroke and the compression stroke. The injector 6 performs split injection. In the second middle-load range 417, the ECU 10 changes the injection mode between a squish injection and a trigger injection. The squish injection is a mode in which fuel is injected during the intake stroke and during the middle period of the compression stroke (see 721 and 722). The trigger injection is a mode in which fuel is injected during the intake stroke and during the end period of the compression stroke (see 725 and 726).

The squish injection slows down the CI combustion. As described above, the fuel injected during the intake stroke is spread inside the cylinder 11 by the strong intake flow and the homogeneous mixture gas is formed inside the cylinder 11. As illustrated in the lower part of FIG. 2, the fuel injected in the middle period of the compression stroke reaches a squish area 171 outside of the cavity 31. The squish area 171 is low in temperature since it is located near a cylinder liner, and the temperature further drops due to latent heat during vaporization of fuel spray. The temperature inside the cylinder 11 locally drops, and the fuel becomes inhomogeneous entirely inside the cylinder 11. As a result, for example, when the in-cylinder temperature is high, the mixture gas is compressed and ignited at a desired timing while reducing abnormal combustion (see 723). The squish injection allows comparatively slow CI combustion.

Each shaded rectangle in FIG. 5 indicates the injection period of the injector 6, and the area of the rectangle corresponds to the injection amount of fuel. In the squish injection, the injection amount of fuel during the compression stroke is larger than the injection amount of fuel during the intake stroke. Since the fuel is injected toward a large area outside of the cavity 31, generation of smoke can be reduced even when the amount of fuel is large. The temperature decreases as the amount of fuel increases. The injection amount of fuel during the compression stroke may be set to an amount capable of achieving a demanded decrease in the temperature.

Figure 6:
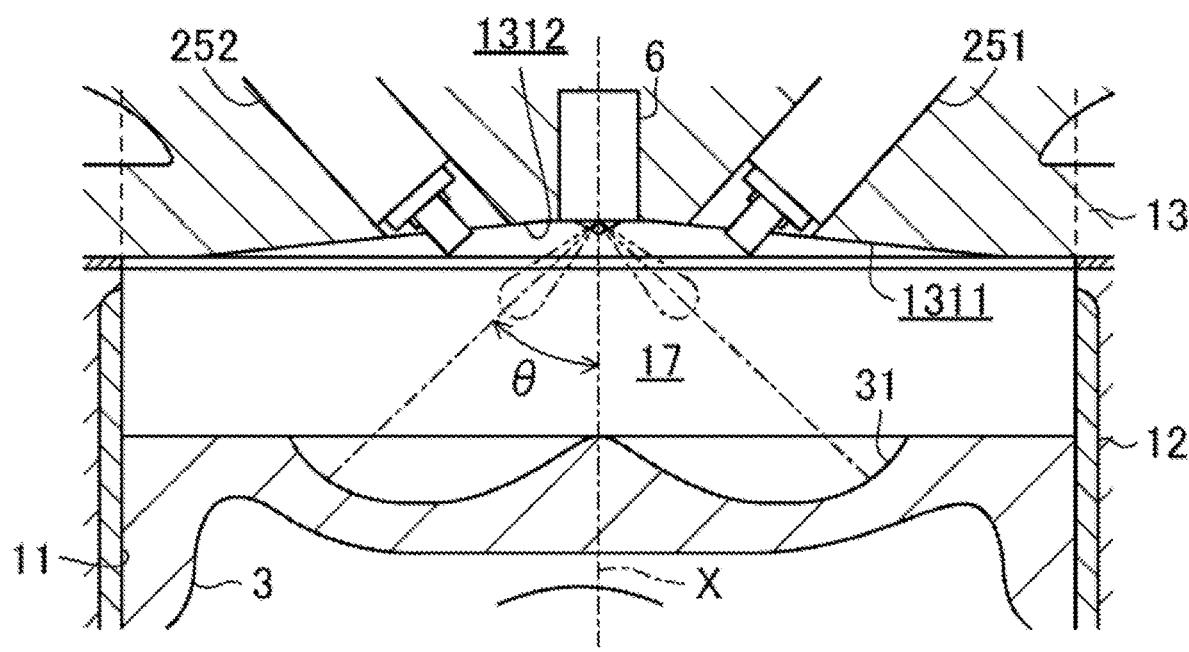
FIG. 6 is a view illustrating a state where fuel is injected into the cylinder in an end period of the compression stroke.

The trigger injection accelerates the CI combustion. As described above, the fuel injected during the intake stroke is spread inside the cylinder 11 by the strong intake flow and the homogeneous mixture gas is formed inside the cylinder 11. As illustrated in FIG. 6, the fuel injected in the end period of the compression stroke is difficult to spread due to the high pressure, and stays in an area inside the cavity 31. Note that the "area inside the cavity 31" means an area inward of an outer peripheral edge of the cavity 31 in the radial direction of the cylinder 11. The internal part of the cavity 31 dented from the top surface of the piston 3 is also included in the area inside of the cavity 31. The fuel inside the cylinder 11 is inhomogeneous. Moreover, the temperature at the central part of the cylinder 11 is high since it is far from the cylinder liner. Since a lump of mixture gas at a high fuel concentration is formed in the area at the high temperature, the compression ignition of the mixture gas is accelerated. As a result, the mixture gas is promptly compressed and ignited after the fuel injection during the compression stroke (see 727), and the CI combustion can be accelerated. The trigger injection enhances combustion stability.

The squish injection and the trigger injection both make the mixture gas inside the cylinder 11 inhomogeneous. In this respect, it is different from the HCCI combustion in which the homogeneous mixture gas is formed. Both of the squish injection and the trigger injection can control the timing of the compression ignition by forming the inhomogeneous mixture gas.

Since the injector 6 injects fuel a plurality of times in this combustion mode, this mode may be referred to as the "Multiple Premixed fuel injection Compression Ignition (MPCI) combustion." The MPCI combustion corresponds to a "second compression ignition combustion mode."

Note that as illustrated in the second base map 402 in FIG. 4, the homogeneous SI combustion or the SPCCI combustion is performed in the third range when the engine 1 is cold (the third range corresponds to the range of the first base map 401 for the warm state, in which the combustion modes are the HCCI, the MPCI, and the SPCCI). This is because the CI combustion becomes instable when the temperature of the engine 1 is low. After the start-up of the engine 1, the ECU 10 changes the base map from the second base map 402 for the cold state to the first base map 401 for the warm state as the coolant temperature rises. When the base map is changed, the ECU 10 may change the combustion mode, for example, from the homogeneous SI combustion to the HCCI combustion even when the speed and the load of the engine 1 do not change.

(Details of Engine Control According to Engine Load)

Here, in the timing charts of the combustion modes illustrated in FIG. 5, the combustion modes illustrated in the lower part of the figure are the modes when the load of the engine 1 is lower, and the combustion modes illustrated in the upper part of the figure are the modes when the engine load is higher. The G/F of the mixture gas becomes lower as the engine load increases. As the engine load decreases, the amount of fresh air introduced into the cylinder 11 becomes smaller and the amount of burnt gas becomes larger.

Figure 7:
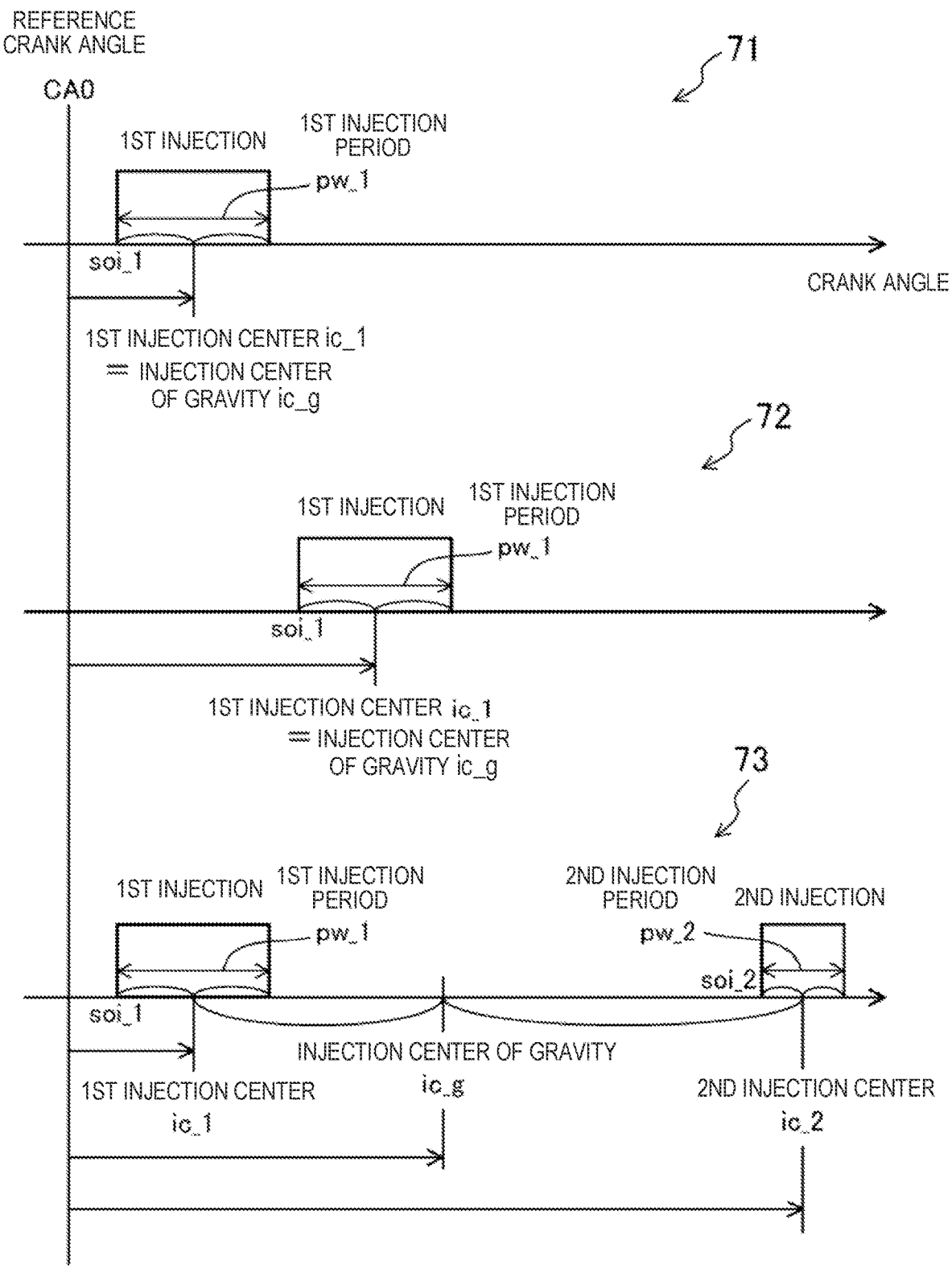
FIG. 7 is a view illustrating a definition of an injection center of gravity.

Next, the injection timings of fuel corresponding to the change in the engine load are compared. Here, an injection center of gravity related to the injection timing of fuel is defined. FIG. 7 is a view illustrating the injection center of gravity. The horizontal axis in FIG. 7 indicates the crank angle, and the crank angle progresses from left to right in the figure. The injection center of gravity is the center of mass of fuel injected in one cycle with respect to the crank angle. The injection center of gravity is the median of the crank angle between the injection start timing and the injection end timing defined based on the injection amount of fuel in one cycle. For example, chart 71 in FIG. 7 illustrates an injection timing soi_1 (start of injection) and an injection period pw_1 in a case where the fuel is injected all at once (first injection). A left end of each rectangle in FIG. 7 indicates a start timing of the injection, a right end indicates an end timing of the injection, and a length between the left and right ends of the rectangle indicates the injection period. The injection pressure of fuel is constant during one combustion cycle. Therefore, the injection amount is in proportion to the injection period. The injection amount may be substituted by the injection period when the injection center of gravity is calculated.

An injection center of gravity ic_g when the fuel is injected all at once coincides with a crank angle ic_1 at the middle of the one injection period. The crank angle ic_1 (i.e., the injection center of gravity ic_g) can be represented by the following Equation (1) based on the injection start timing soi_1, the injection period pw_1, and a speed Ne of the engine 1.

$$ic\_1 = soi\_1 + (pw\_1 * Ne * 360/60)/2 = soi\_1 + 3 * pw\_1 * Ne \quad (1)$$

Chart 72 in FIG. 7 illustrates a case where the start timing of the injection is retarded from the case in chart 71. Since fuel is injected all at once also in chart 72, the injection center of gravity can be calculated based on Equation (1). In the case where the fuel is injected all at once, the injection center of gravity is retarded as the start timing of the injection is retarded.

Note that although illustration is omitted, the injection center of gravity changes when the injection start timing is the same and the injection period changes.

Chart 73 in FIG. 7 illustrates a case of the split injection. The injection timing and the injection period of the first injection in chart 73 are the same as the injection timing and the injection period of the first injection in chart 71. A start timing of a second injection is later than the start timing of the first injection.

When the injection includes two injections (first and second injections), since the injection center of gravity ic_g is the center of mass of fuel injected in one cycle with respect to the crank angle, the injection center of gravity ic_g is defined on the basis of the following Equation (2).

$$ic\_g = (pw\_1 * ic\_1 + pw\_2 * ic\_2)/(pw\_1 + pw\_2) \quad (2)$$

The "ic_1" can be calculated based on Equation (1). Similarly, "ic_2" can be calculated based on the following Equation (3).

$$ic\_2 = soi\_2 + (pw\_2 * Ne * 360/60)/2 = soi\_2 + 3 * pw\_2 * Ne \quad (3)$$

On the basis of Equations (1), (2), and (3), the injection center of gravity ic_g can be calculated based on the following Equation (4).

$$ic\_g = (pw\_1 * (soi\_1 + 3 * pw\_1 * Ne) + pw\_2 * (soi\_2 + 3 * pw\_2 * Ne))/(pw\_1 + pw\_2) \quad (4)$$

Since the second injection is added to the first injection in chart 73 in FIG. 7, the injection center of gravity ic_g in chart 73 is retarded from the injection center of gravity ic_g in chart 71. Note that, when Equation (4) is generalized and the injector 6 injects fuel "n" times in one cycle, the injection center of gravity ic_g can be calculated based on the following Equation (5).

$$ic\_g = (pw\_1 * (soi\_1 + 3 * pw\_1 * Ne) + \ldots + pw\_n * (soi\_n + 3 * pw\_n * Ne))/(pw\_1 + \ldots + pw\_n) \quad (5)$$

As illustrated in FIG. 5, the G/F of the mixture gas is high (e.g., G/F=40:1) when the load of the engine 1 is low. The injector 6 injects fuel during the intake stroke. The injection center of gravity is on the advanced side. When the load of the engine 1 is higher, the G/F of the mixture gas is lower (e.g., G/F=35:1 or 38:1). The injector 6 injects fuel during the intake stroke and during the compression stroke (see 721, 722, 725, and 726). The injection center of gravity is retarded.

When the load of the engine 1 is further higher, the G/F of the mixture gas is further lower (e.g., G/F=35:1). The injector 6 injects fuel during the compression stroke (see 717). The injection center of gravity is further retarded.

When the load of the engine 1 is further higher, the G/F of the mixture gas is further lower (e.g., G/F=20:1 or 25:1).

The injector 6 injects fuel during the intake stroke (see 702), or during the compression stroke (see 706 and 710). The injection center of gravity is advanced, or retarded.

When comparing the HCCI combustion with the homogeneous SI combustion and the retarded SI combustion, the G/F of the mixture gas is higher in the HCCI combustion, and the G/F of the mixture gas is lower in the homogeneous SI combustion and the retarded SI combustion. Suppose that the engine 1 is an engine which switches only between the HCCI combustion, and the homogeneous SI combustion or the retarded SI combustion. In this case, when the combustion mode is switched corresponding to the change in the load of the engine 1, the G/F of the mixture gas needs to be changed largely. However, the responsivity of the variable valve operating device including the intake S-VT 231, the intake CVVL 232, the exhaust S-VT 241, and the exhaust VVL 242 is not so high. Therefore, it is difficult to instantly change the G/F of the mixture gas.

In the MPCI combustion and the SPCCI combustion, the G/F of the mixture gas is between the G/F for the HCCI combustion and the G/F for the SI combustion (i.e., at the middle G/F). The G/F can be changed promptly between the HCCI combustion, and the MPCI combustion or the SPCCI combustion, and between the SI combustion, and the MPCI combustion or the SPCCI combustion.

Moreover, even when the G/F is in the state where the HCCI combustion is possible, if the in-cylinder temperature $T_{IVC}$ at the close timing of the intake valve 21 (an intake-valve-closing temperature) is low, ignitability of the mixture gas decreases, and thus, the HCCI combustion is not appropriately executed. In order to adjust the in-cylinder temperature $T_{IVC}$, the filling amount of intake air, such as internal EGR gas, needs to be adjusted. Therefore, unless the responsivity of the variable valve operating device (including the intake S-VT 231, the intake CVVL 232, the exhaust S-VT 241, and the exhaust VVL 242) is sufficiently high, instant changing of the in-cylinder temperature $T_{IVC}$ is also difficult.

As will be described later in detail, the MPCI combustion and the SPCCI combustion are the combustion modes which can secure combustion stability and reduce abnormal combustion when the mixture gas is at the middle G/F and the in-cylinder temperature $T_{IVC}$ is moderate. The engine 1 can promptly change the G/F and the in-cylinder temperature $T_{IVC}$ corresponding to the change in the engine load so as to seamlessly switch the combustion mode between the SI combustion, the HCCI combustion, the MPCI combustion, and the SPCCI combustion. As a result, securing combustion stability and reducing abnormal combustion can be achieved over the entire load range of the engine 1.

Note that in the MPCI combustion, the injector 6 injects fuel during the intake stroke and during the compression stroke. Alternatively, the injector 6 may inject fuel all at once such that the injection center of gravity is retarded from the injection center of gravity in the HCCI combustion, instead of the split injection. When the injection center of gravity is retarded, a period of time from the fuel injection to the ignition becomes shorter, and thus, the mixture gas inside the cylinder 11 does not become homogeneous. Such inhomogeneous mixture gas enables the securing of combustion stability and the reduction in abnormal combustion.

(Modifications of Open-and-Close Mode of Intake Valve and Exhaust Valve)

FIG. 5 illustrates the configuration in which the exhaust VVL 242 opens the exhaust valve 22 during each of the exhaust stroke and the intake stroke, but the configuration of the variable valve operating device is not limited to the configuration. Next, modifications of the variable valve operating device are described with reference to FIG. 8.

Figure 8:
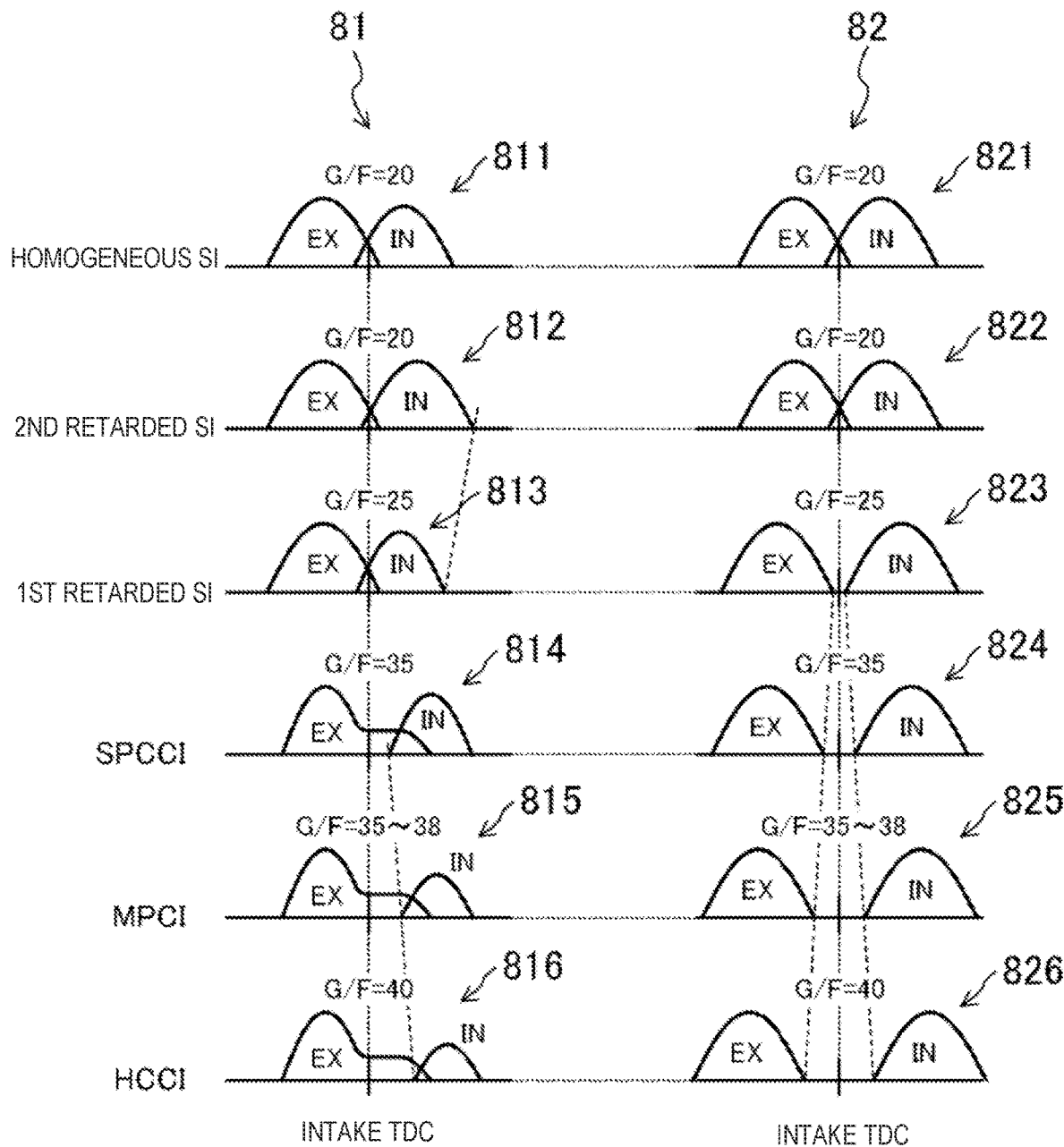
FIG. 8 illustrates a modification of the open and close operations of the intake valve and the exhaust valve in each combustion mode.

In FIG. 8, "81" illustrates lift curves of the exhaust valve 22, which are different from the lift curves illustrated in FIG. 5. A lift curve 811 in the homogeneous SI combustion, a lift curve 812 in the second retarded SI combustion, a lift curve 813 in the first retarded SI combustion are the same as the lift curves 701, 705, and 709 in FIG. 5, respectively. A lift curve 814 in the SPCCI combustion, a lift curve 815 in the MPCI combustion, and a lift curve 816 in the HCCI combustion are different from the lift curves 716, 720, 724, and 713 in FIG. 5. As indicated by 814, 815, and 816 in FIG. 8, after the exhaust valve 22 is opened during the exhaust stroke and the lift amount gradually decreases from the maximum lift, the exhaust valve 22 is not closed and maintains a given lift amount. The exhaust valve 22 is not closed until a given timing after the intake TDC during the intake stroke. Maintaining the open state of the exhaust valve 22 without closing is advantageous for loss reduction of the engine 1. Note that lift curves of the intake valve 21 in the lift curve 814 in the SPCCI combustion, the lift curve 815 in the MPCI combustion, and the lift curve 816 in the HCCI combustion are the same as the lift curves 716, 720, 724, and 713 in FIG. 5, respectively.

In FIG. 8, "82" illustrates still other lift curves of the exhaust valve 22. In this modification, the variable valve operating device is not provided with the intake CVVL 232 and the exhaust VVL 242. The variable valve operating device is provided with the intake S-VT 231 and the exhaust S-VT 241, and changes the open and close timings of the intake valve 21 and the exhaust valve 22.

As indicated by 823, 824, 825, and 826, a negative overlap period during which both of the intake valve 21 and the exhaust valve 22 are closed having the intake TDC therebetween, is provided so that internal EGR gas remains inside the cylinder 11. That is, the exhaust valve 22 is closed before the intake TDC.

When the load of the engine 1 decreases and the amount of burnt gas introduced into the cylinder 11 is to be increased, the close timing of the exhaust valve 22 advances. Moreover, when the amount of fresh air introduced into the cylinder 11 is to be reduced, the close timing of the intake valve 21 retards after an intake bottom dead center (BDC) to be separated therefrom. The negative overlap period is lengthened as the load of the engine 1 is lower.

Note that the variable valve operating device may provide a positive overlap period. Such as at 821 and 822, during which both of the intake valve 21 and the exhaust valve 22 are opened having the intake TDC therebetween so that internal EGR gas is reintroduced into the cylinder 11.

(Determination of Combustion Mode)

The ECU 10 determines the operating state of the engine 1 based on the measurement signals of the sensors SW1 to SW10 described above. The ECU 10 controls the intake S-VT 231, the intake CVVL 232, the exhaust S-VT 241, and the exhaust VVL 242 according to the determined operating state. The intake S-VT 231, the intake CVVL 232, the exhaust S-VT 241, and the exhaust VVL 242 control the opening and closing of the intake valve 21 and the exhaust valve 22 based on the control signals received from the ECU 10. Accordingly, the filling amount of intake air inside the cylinder 11 is adjusted. In more detail, the amount of fresh air and burnt gas introduced into the cylinder 11 is adjusted.

The ECU 10 also adjusts the injection amount and timing of fuel according to the operating state of the engine 1. The injector 6 injects fuel into the cylinder 11 in a specified amount at a specified timing based on the control signal received from the ECU 10.

The ECU 10 also controls the first spark plug 251 and the second spark plug 252 according to the operating state of the engine 1. The first spark plug 251 and the second spark plug 252 ignite the mixture gas at a specified timing based on the control signal received from the ECU 10. The ECU 10 may not output the control signal to the first spark plug 251 and the second spark plug 252. In this case, the first spark plug 251 and the second spark plug 252 are inhibited from igniting the mixture gas.

As described above, the engine 1 operates while switching the combustion mode between the plurality of types of combustion modes according to the operating state of the engine 1. Therefore, securing combustion stability and reducing abnormal combustion can be achieved over the entire wide operation range.

Figure 9:
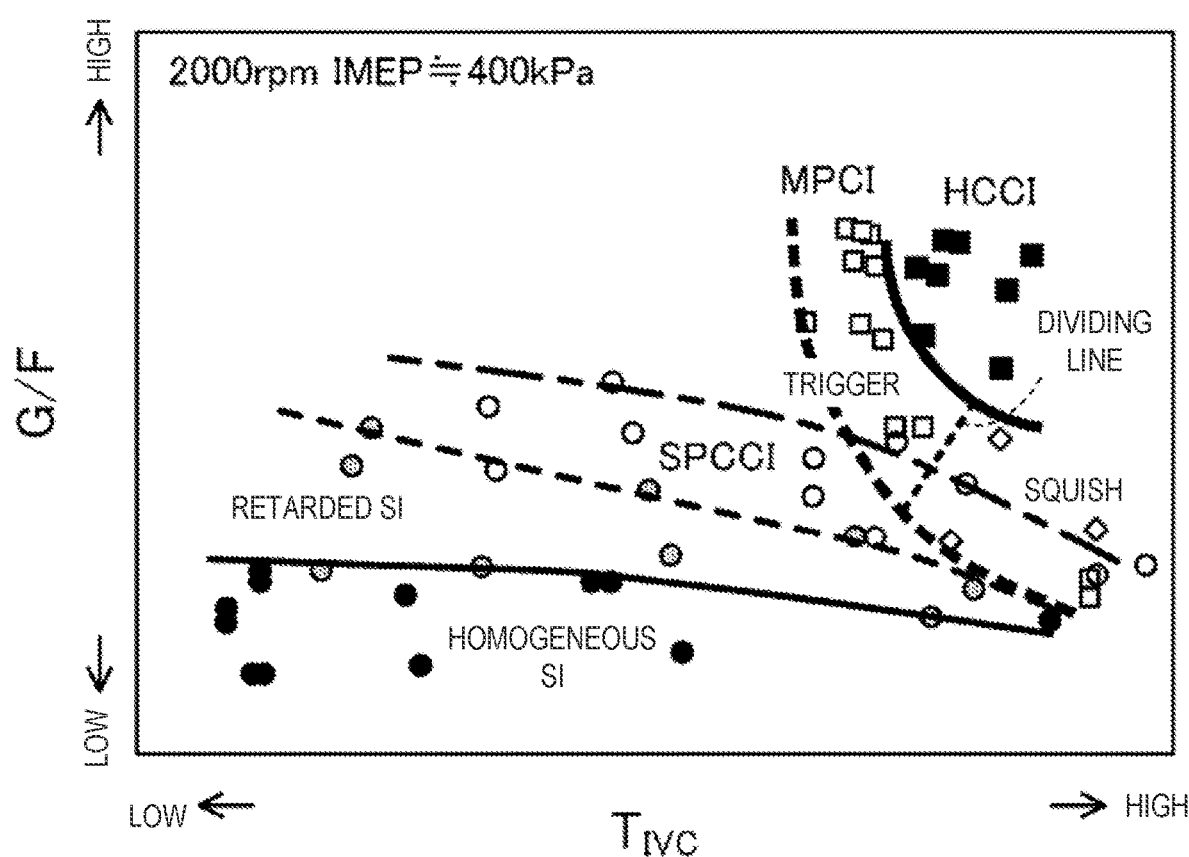
FIG. 9 is a view illustrating a range defined based on an in-cylinder temperature $T_{IVC}$ and a G/F, within which each combustion mode is achieved.

FIG. 9 illustrates a relationship between the G/F of the mixture gas and an in-cylinder temperature $T_{IVC}$ in each combustion mode, at which the securing of combustion stability and reduction in the abnormal combustion are achieved. To be accurate, the in-cylinder temperature $T_{IVC}$ is an in-cylinder temperature when the intake valve 21 is closed. Moreover, FIG. 9 illustrates an example when the speed of the engine 1 is 2,000 rpm, and an IMEP (Indicated Mean Effective Pressure) is about 400 kPa.

1. Homogeneous SI Combustion

The homogeneous SI combustion can secure combustion stability and reduce abnormal combustion when the G/F is relatively low. As the G/F increases (i.e., as the G/F becomes leaner), the combustion period of the mixture gas becomes longer. Even if the ignition timing is advanced to shorten the combustion period, combustion stability cannot be secured when the G/F is too high. That is, the maximum G/F at which the homogeneous SI combustion is possible exists (see a solid line in FIG. 9).

Moreover, when the $T_{IVC}$ becomes high due to the increase in the internal EGR gas, the combustion period becomes longer as a result of the deceleration in the combustion. The combustion period can be shortened by advancing the ignition timing until the $T_{IVC}$ reaches a certain temperature. When the $T_{IVC}$ is further increased, abnormal combustion is likely to be caused. Even if the ignition timing is retarded to reduce abnormal combustion, the ignition timing becomes too late when the $T_{IVC}$ becomes too high, and thus, combustion stability cannot be secured. That is, the maximum in-cylinder temperature $T_{IVC}$ at which the homogeneous SI combustion is possible exists.

2. HCCI Combustion

The HCCI combustion can secure combustion stability and reduce abnormal combustion when the G/F is relatively high and the in-cylinder temperature $T_{IVC}$ is relatively high. As the G/F decreases (i.e., as the G/F becomes richer), the CI combustion becomes too intense, which leads to, for example, combustion noise exceeding the allowable level. Even if the $T_{IVC}$ is lowered to retard the ignition timing and decelerate the combustion, combustion stability degrades when the $T_{IVC}$ becomes too low. That is, the minimum G/F and the minimum in-cylinder temperature $T_{IVC}$ at which the HCCI combustion is possible exist (see a thicker solid line in FIG. 9).

As is apparent from FIG. 9, the "G/F-$T_{IVC}$ range" where the homogeneous SI combustion is possible, and the "G/F-$T_{IVC}$ range" where the HCCI combustion is possible are separated from each other. As described above, suppose that the engine 1 switches only between the homogeneous SI combustion and the HCCI combustion corresponding to the change in the load of the engine 1, the G/F of the mixture gas and the in-cylinder temperature $T_{IVC}$ need to be changed largely corresponding to the switching of the combustion mode. The G/F of the mixture gas and the in-cylinder temperature $T_{IVC}$ are adjusted mainly by the adjustment of the filling amount of intake air. However, it is difficult to instantly change the G/F of the mixture gas and the in-cylinder temperature $T_{IVC}$ corresponding to the switching of the combustion mode, because of a response delay of the intake S-VT 231, the intake CVVL 232, the exhaust S-VT 241, and the exhaust VVL 242.

3. Retarded SI Combustion

As described above, when the G/F of the mixture gas is made leaner, or the in-cylinder temperature $T_{IVC}$ is made higher than the operable range of the homogeneous SI combustion, combustion stability cannot be secured. In the retarded SI combustion, as described above, the injector 6 injects fuel into the cylinder 11 near the compression TDC, that is, before the ignition by the first spark plug 251 and the second spark plug 252. Since the fuel is not injected into the cylinder 11 until immediately before the ignition, preignition can be avoided.

The injection of fuel near the compression TDC causes the flow inside the cylinder 11, and after the ignition by the first spark plug 251 and the second spark plug 252, the flame is promptly propagated by the flow. Accordingly, the rapid combustion is achieved, and combustion stability can be secured while reducing knocking. In the "G/F-$T_{IVC}$ range" where the retarded SI combustion is possible, the G/F of the mixture gas is higher than that in the "G/F-$T_{IVC}$ range" where the homogeneous SI combustion is possible (see a broken line in FIG. 9). The retarded SI combustion extends its operable range in the leaner-G/F side compared to the homogeneous SI combustion.

4. SPCCI Combustion

When the G/F of the mixture gas is made further leaner, or the in-cylinder temperature $T_{IVC}$ is made further higher than the operable range of the retarded SI combustion, gentle CI combustion (different from knocking) starts after the flame propagation combustion started by the ignition of the first spark plug 251 and the second spark plug 252. In the SPCCI combustion including the controlled CI combustion, the G/F is higher than the "G/F-$T_{IVC}$ range" where the retarded SI combustion is possible (see a one-dot chain line in FIG. 9). The SPCCI combustion extends its operable range in the leaner-G/F side compared to the homogeneous SI combustion and the retarded SI combustion.

However, a large gap still exists between the "G/F-$T_{IVC}$ range" of the SPCCI combustion and the "G/F-$T_{IVC}$ range" of the HCCI combustion.

5. MPCI Combustion

The MPCI combustion extends its operable range in the richer-G/F side and the lower-$T_{IVC}$ side, compared to the operable range of the HCCI combustion.

First, when the G/F of the mixture gas is made richer than the operable range of the HCCI combustion, the CI combustion becomes intense, which leads to abnormal combustion. In order to decelerate the CI combustion, fuel is injected into the cylinder 11 in the middle period of the compression stroke in the squish injection of the MPCI combustion. As described above, the injected fuel reaches the squish area 171 outside of the cavity 31, and locally increases the fuel concentration at the squish area 171 and decreases the temperature. As a result, the timing of the compression ignition is retarded, and the combustion is slowed down. The squish injection extends its operable range mainly in the richer-G/F side compared to the operable range of the HCCI combustion.

Next, when the $T_{IVC}$ is made lower compared to the operable range of the HCCI combustion, the compression ignition timing retards and the combustion becomes too slow, which lowers combustion stability. In order to advance the compression ignition timing, fuel is injected into the cylinder 11 in the end period of the compression stroke in the trigger injection of the MPCI combustion. As described above, the injected fuel does not spread and forms the lump of mixture gas at a high fuel concentration inside the cavity 31. As a result, the compression ignition starts promptly after the fuel injection, and the surrounding homogeneous mixture gas also promptly combusts by self-ignition. The trigger injection extends its operable range mainly in the lower-$T_{IVC}$ side compared to the operable range of the HCCI combustion.

Part of the "G/F-$T_{IVC}$ range" of the MPCI combustion overlaps with the "G/F-$T_{IVC}$ range" of the SPCCI combustion. The gap between the "G/F-$T_{IVC}$ range" of the homogeneous SI combustion, and the "G/F-$T_{IVC}$ range" of the HCCI combustion is filled.

Here, the "G/F-$T_{IVC}$ range" of the MPCI combustion is divided into the ranges where the squish injection is performed and where the trigger injection is performed (see a broken dividing line in FIG. 9). In the range where the squish injection is performed in the "G/F-$T_{IVC}$ range" of the MPCI combustion, the G/F is relatively low and the $T_{IVC}$ is relatively high. On the other hand, in the range where the trigger injection is performed in the "G/F-$T_{IVC}$ range" of the MPCI combustion, the G/F is relatively high and the $T_{IVC}$ is relatively low.

(Operation Control of Engine)

The ECU 10 adjusts the G/F of the mixture gas and the in-cylinder temperature $T_{IVC}$ based on the base map illustrated in FIG. 4 such that the combustion mode corresponding to the demanded load and speed of the engine 1 is achieved.

However, the G/F of the mixture gas and/or the in-cylinder temperature $T_{IVC}$ may not correspond to the operating state of the engine 1, and may be deviated from the target G/F and/or the target in-cylinder temperature $T_{IVC}$ due to, for example, the response delay of the variable valve operating device. When the G/F of the mixture gas and/or the in-cylinder temperature $T_{IVC}$ are deviated from the target G/F and/or the target in-cylinder temperature $T_{IVC}$, the combustion of the mixture gas cannot be performed in the intended mode, which may lower combustion stability and/or cause abnormal combustion. In this respect, the ECU 10 temporarily sets the combustion mode according to the operation state of the engine 1, determines the target G/F and/or the target in-cylinder temperature $T_{IVC}$, and controls the variable valve operating device. Moreover, the ECU 10 switches the combustion mode according to an actual G/F and/or an actual in-cylinder temperature $T_{IVC}$ (accurately, an estimated G/F and/or an estimated in-cylinder temperature $T_{IVC}$), and adjusts the injection timing of fuel and whether or not to perform the ignition.

Figure 10:
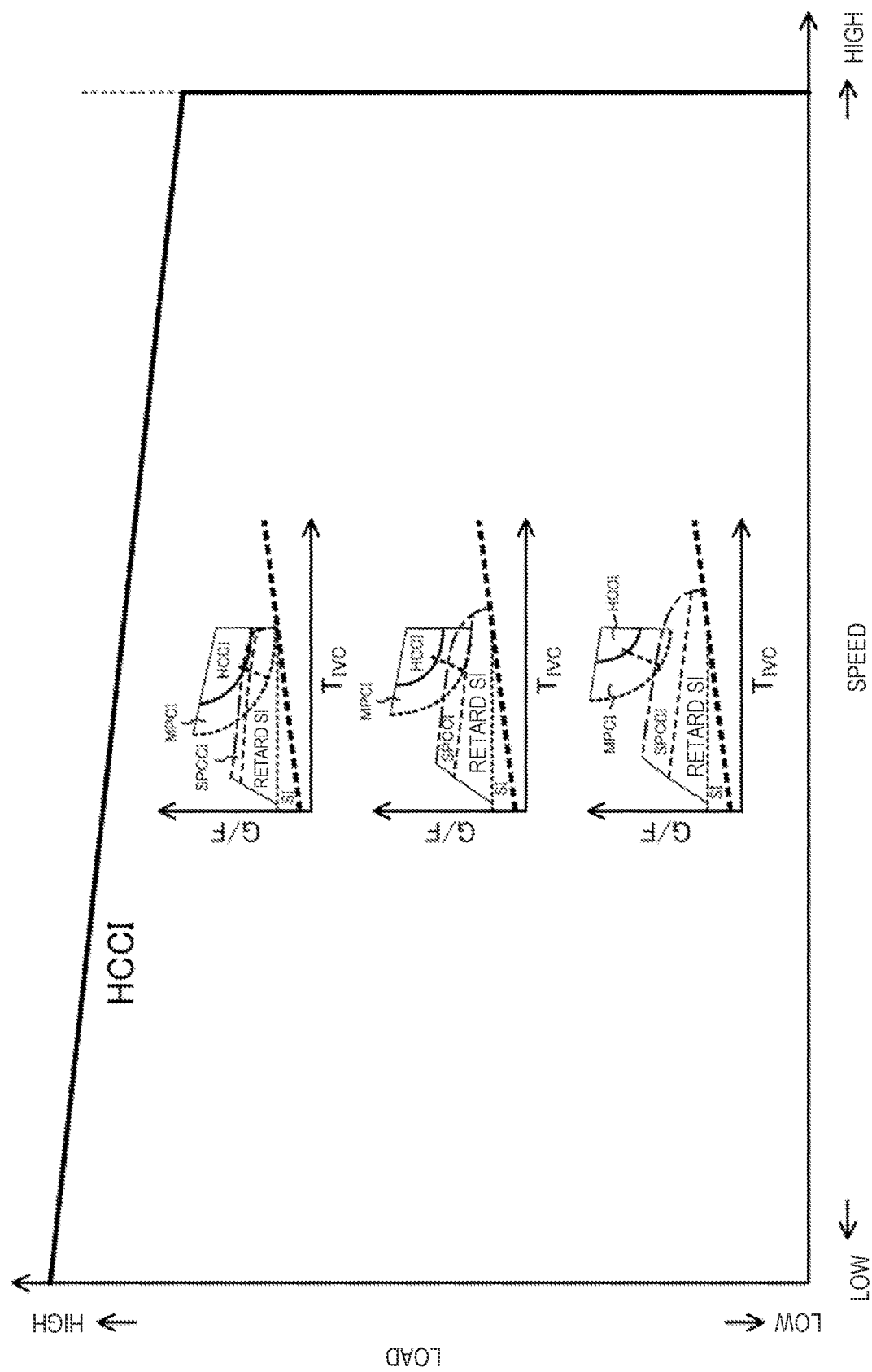
FIG. 10 is a view illustrating a selection map of the combustion mode in an HCCI combustion range.

FIG. 10 illustrates a selection map related to the operation control of the engine 1. FIG. 10 is an enlarged view of the third range in the first base map 401 of FIG. 4, where the HCCI combustion is performed (i.e., the low-load range 415). The low-load range 415 is defined based on the speed and the load of the engine 1. As illustrated in FIG. 10, the low-load range 415 is further subdivided. Although in the selection map of FIG. 10 the low-load range 415 is subdivided into three ranges according to the load as one example, the number of subdivided ranges is not limited in particular. Note that although illustration is omitted, such a selection map is set for each range in the base map of FIG. 4.

The "G/F-$T_{IVC}$ range" corresponding to FIG. 9 is set for each subdivided range in the low-load range 415. As described above, the "G/F-$T_{IVC}$ range" defines the combustion mode based on the G/F of the mixture gas and the in-cylinder temperature $T_{IVC}$. The ECU 10 sets (temporarily sets) the combustion mode based on the base map of FIG. 4 according to the demanded load and speed of the engine 1, and adjusts the filling amount of intake air. Furthermore, the ECU 10 conclusively determines the combustion mode based on the selection map of FIG. 10 according to the demanded load and speed, and the estimated G/F and in-cylinder temperature $T_{IVC}$.

Here, as illustrated in FIG. 10, the "G/F-$T_{IVC}$ range" changes according to the load of the engine 1. Particularly, as illustrated in FIG. 11, when the speed of the engine 1 is constant, the $T_{IVC}$ largely changes according to the demanded load of the engine 1.

Figure 11:
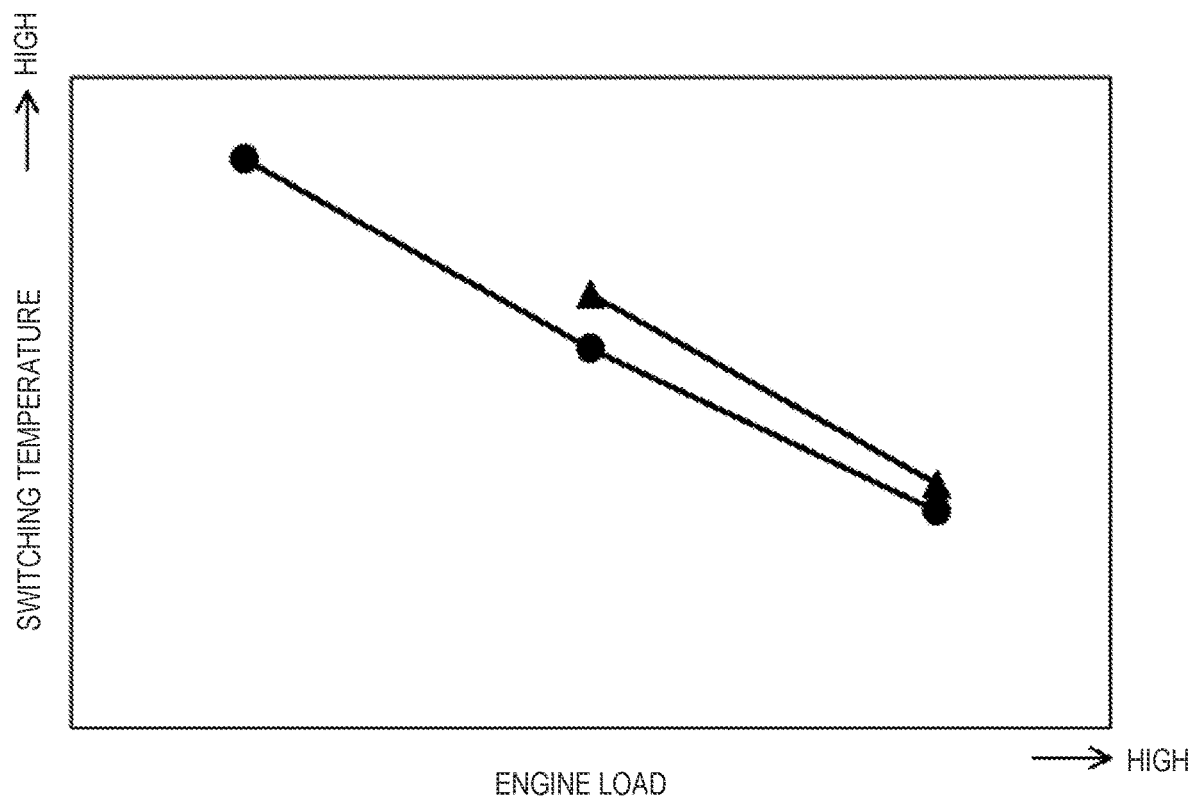
FIG. 11 is one example of a graph illustrating a relationship between an engine load and the $T_{IVC}$ at which the combustion mode is switched between a mode where the entire mixture gas combusts by compression ignition, and a mode where flame propagation combustion is at least partially used.

FIG. 11 illustrates a relationship of a switching temperature at which the combustion mode is switched between the mode where the entire fuel combusts by compression ignition (the MPCI combustion or the HCCI combustion), and the mode where the flame propagation combustion is at least partially used (SPCCI combustion, the retarded SI combustion, or the SI combustion), with respect to the demanded load at the same speed. The speed is a speed at which the HCCI combustion is possible, and set to, for example, 1,000 rpm. In FIG. 11, the range of the demanded load is a value at or below the demanded load at which the HCCI combustion is possible as illustrated in FIGS. 4 and 10. The vertical axis in FIG. 11 indicates the switching temperature between the MPCI combustion and the SPCCI combustion. The ECU 10 executes the MPCI combustion or the HCCI combustion when the in-cylinder temperature is above the switching temperature, and executes the SPCCI combustion, the retarded SI combustion, or the SI combustion when the in-cylinder temperature is below the switching temperature.

In FIG. 11, black circles indicate the switching temperature when the G/F is relatively high, and black triangles indicate the switching temperature when the G/F is relatively low.

As illustrated in FIG. 11, regardless of the G/F, the switching temperature is low when the demanded load is high compared to when the demanded load is low. Particularly, the switching temperature decreases as the demanded load is higher. Generally, since the fuel injection amount increases as the demanded load increases, the fuel concentration inside the cylinder 11 increases even when the homogeneous mixture gas is formed inside the cylinder 11. Therefore, even when the $T_{IVC}$ is low, combustion stability of the CI combustion can be improved. As a result, the switching temperature can be set lower as the demanded engine load is higher.

Note that as illustrated in FIG. 11, although the switching temperature is dependent also on the G/F, the influence of the G/F is smaller than the demanded load. Therefore, the switching temperature can be set basically depending on the demanded load.

Therefore, in this embodiment, when the engine speed is at a given speed and the demanded load is at a first load which is relatively low, and when the in-cylinder temperature $T_{IVC}$ is above a first temperature which is relatively high, the ECU 10 executes the HCCI combustion or the MPCI combustion which does not utilize the SI combustion. On the other hand, when the in-cylinder temperature $T_{IVC}$ is below the first temperature, the ECU 10 executes the SPCCI combustion, the retarded SI combustion, or the SI combustion which utilizes the SI combustion. Furthermore, when the engine speed is at the given speed and the demanded load is at a second load which is relatively high, and when the in-cylinder temperature $T_{IVC}$ is above a second temperature which is relatively low, the ECU 10 executes the HCCI combustion or the MPCI combustion. On the other hand, when the in-cylinder temperature $T_{IVC}$ is below the second temperature, the ECU 10 executes the SPCCI combustion, the retarded SI combustion, or the SI combustion. Note that the given speed is an engine speed which is arbitrarily set within a range where the HCCI combustion is possible. Accordingly, when the in-cylinder temperature is low, the combustion mode is set to the mode where the SI combustion is at least partially used, and thus, combustion stability is improved. Moreover, it is possible to increase the temperature inside the cylinder to be the in-cylinder temperature $T_{IVC}$ at which the HCCI combustion and the MPCI combustion are possible. As a result, the improvement in both of the fuel efficiency and combustion stability can be achieved.

Note that when the engine speed is at the given speed and the demanded load is the first load which is relatively low, and the in-cylinder temperature $T_{IVC}$ is below the first temperature, the ECU 10 executes the SPCCI combustion from the perspective of improving the thermal efficiency of the engine 1 as much as possible. Moreover, as illustrated in FIGS. 9 and 10, although the operable range of the MPCI combustion and the operable range of the SPCCI combustion partially overlap with each other, in this embodiment, the MPCI combustion is executed in preference to SPCCI combustion.

Moreover, in this embodiment, within the operation range above the first temperature where the HCCI combustion and the MPCI combustion (i.e., the compression ignition combustion of the entire mixture gas inside the cylinder 11) are possible, the ECU 10 executes the MPCI combustion when the in-cylinder temperature $T_{IVC}$ is relatively low, and executes the HCCI combustion when the in-cylinder temperature $T_{IVC}$ is relatively high from the perspective of improving combustion stability of the CI combustion.

Moreover, in this embodiment, the switching temperature between the HCCI combustion and the MPCI combustion is also set to be lower as the load increases. Therefore, the combustion mode can be switched to the HCCI combustion as early as possible, thus the fuel efficiency of the engine 1 being improved.

(Flowchart)

Figure 12:
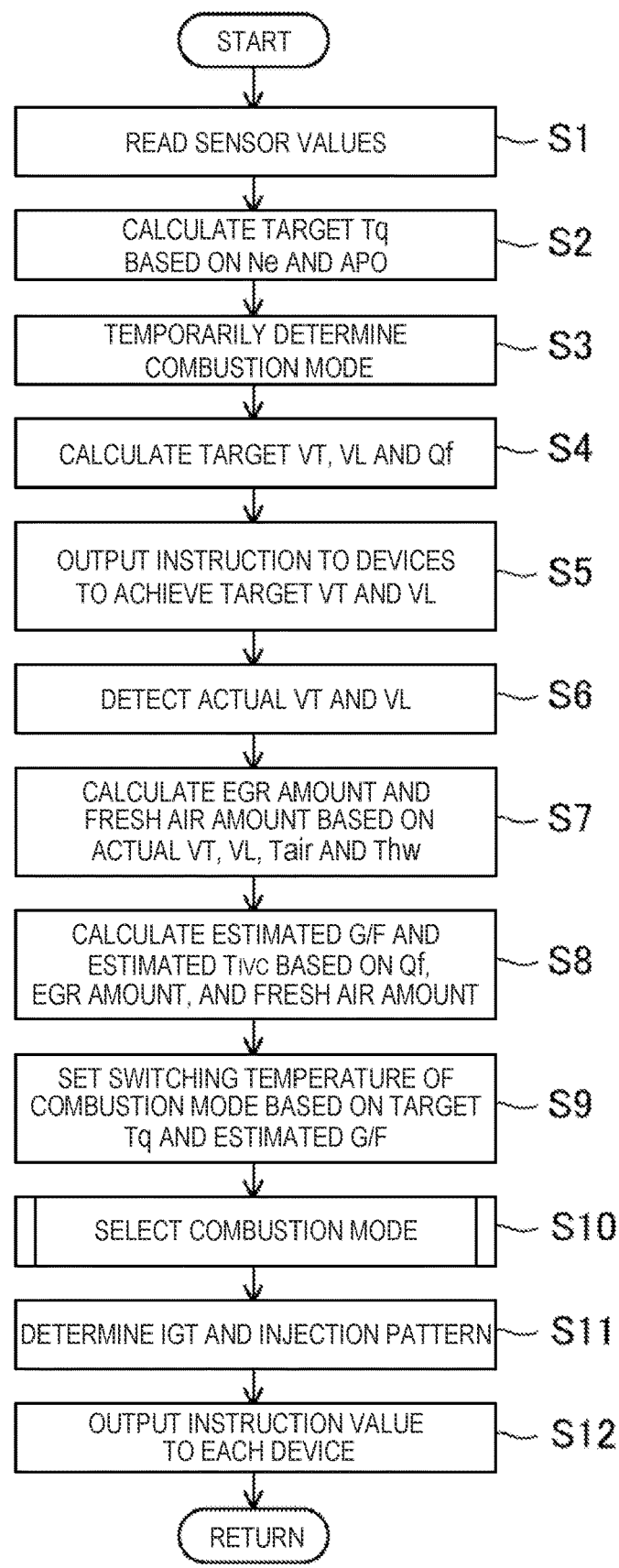
FIG. 12 is part of a flowchart illustrating a control process related to the operation of the engine, executed by an engine control unit (ECU).

Next, process of operation control of the engine 1, executed by the ECU 10 is described with reference to FIGS. 12 and 13. Note that the engine load is within the range where the HCCI combustion is executed in the map of FIG. 4.

First, at step S1, the ECU 10 acquires the measurement signals of the various sensors, and next at step S2, the ECU 10 calculates a target torque Tq (or the demanded load) based on the engine speed Ne and an accelerator opening APO. As described above, this target torque Tq is within the range where the HCCI combustion is executed in the map of FIG. 4.

At step S3, the ECU 10 selects the first base map 401 or the second base map 402 illustrated in FIG. 4 based on the temperature of the coolant of the engine 1, and temporarily determines the combustion mode based on the calculated target torque Tq and the engine speed Ne, and the selected base map.

At step S4, the ECU 10 calculates, based on the operating state of the engine 1, a target valve timing VT and a target valve lift VL for each of the intake valve 21 and the exhaust valve 22. The target valve lift VL includes the valve lift of the intake valve 21 which is continuously changed by the intake CVVL 232, and the cam of the exhaust valve 22 switched by the exhaust VVL 242. Moreover, at step S4, the ECU 10 calculates a target amount of fuel injection Qf.

At step S5, the ECU 10 outputs the control signals to the intake S-VT 231, the intake CVVL 232, the exhaust S-VT 241, and the exhaust VVL 242 to achieve the target valve timing VT and the target valve lift VL.

At step S6, the ECU 10 detects an actual valve timing VT and an actual valve lift VL of the intake valve 21, and an actual valve timing VT and an actual valve lift VL of the exhaust valve 22, based on the measurement signals of the intake cam-angle sensor SW8, the exhaust cam-angle sensor SW9, and the intake cam-lift sensor SW10.

At step S7, the ECU 10 estimates the amount of burnt gas (EGR amount) and fresh air introduced into the cylinder 11 based on the actual valve timing VT and valve lift VL, an air temperature Tair, and a coolant temperature Thw of the engine 1.

Then, at step S8, the ECU 10 estimates the G/F of the mixture gas and the in-cylinder temperature $T_{IVC}$ based on the fuel injection amount Qf, and the amount of burnt gas and fresh air estimated at step S7.

Next, at step S9, the ECU 10 sets the in-cylinder temperature $T_{IVC}$ for the switching of the combustion mode (i.e., the switching temperature) based on the target torque Tq calculated at step S2 and the G/F estimated at step S8. This switching temperature is the switching temperatures for the HCCI combustion, the MPCI combustion, the SPCCI combustion, and the SI combustion, and includes the switching temperatures between the HCCI combustion and the MPCI combustion, between the MPCI combustion and the SPCCI combustion, and between the SPCCI combustion and the SI combustion. The SI combustion includes the retarded SI combustion and the homogeneous SI combustion.

Figure 13:
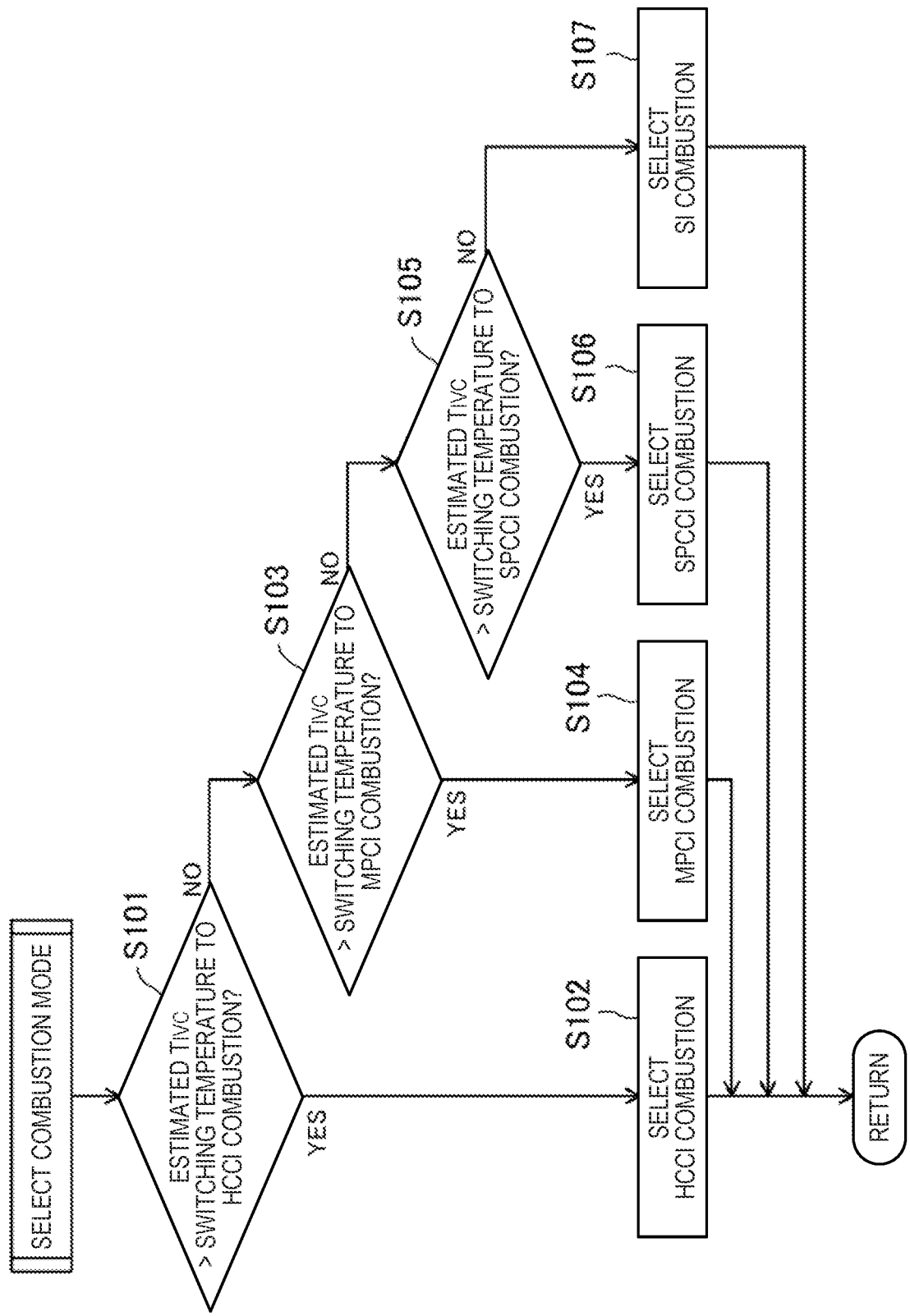
FIG. 13 is the rest of the flowchart illustrating the control process related to the operation of the engine, executed by the ECU.

At step S10, as illustrated in FIG. 13, the ECU 10 determines the combustion mode corresponding to the in-cylinder temperature $T_{IVC}$ estimated at step S8.

In detail, at step S101, the ECU 10 determines whether the estimated in-cylinder temperature $T_{IVC}$ is above the switching temperature to the HCCI combustion. When the ECU 10 determines that the estimated in-cylinder temperature $T_{IVC}$ is above the switching temperature to the HCCI combustion (step S101: YES), the ECU 10 proceeds to step S102. On the other hand, when the ECU 10 determines that the estimated in-cylinder temperature $T_{IVC}$ is below the switching temperature to the HCCI combustion (step S101: NO), the ECU 10 proceeds to step S103.

At step S102, the ECU 10 sets the combustion mode to the HCCI combustion.

On the other hand, at step S103, the ECU 10 determines whether the estimated in-cylinder temperature $T_{IVC}$ is above the switching temperature to the MPCI combustion. When the ECU 10 determines that the estimated in-cylinder temperature $T_{IVC}$ is above the switching temperature to the MPCI combustion (step S103: YES), the ECU 10 proceeds to step S104. On the other hand, when the ECU 10 determines that the estimated in-cylinder temperature $T_{IVC}$ is below the switching temperature to the MPCI combustion (step S103: NO), the ECU 10 proceeds to step S105.

At step S104, the ECU 10 sets the combustion mode to the MPCI combustion.

On the other hand, at step S105, the ECU 10 determines whether the estimated in-cylinder temperature $T_{IVC}$ is at the temperature at which the SPCCI combustion is possible. When the ECU 10 determines that the estimated in-cylinder temperature $T_{IVC}$ is at the temperature at which the SPCCI combustion is possible (step S105: YES), the ECU 10 proceeds to step S106. On the other hand, when the ECU 10 determines that the estimated in-cylinder temperature $T_{IVC}$ is at the temperature at which the SPCCI combustion cannot be performed (step S105: NO), the ECU 10 proceeds to step S107.

At step S106, the ECU 10 sets the combustion mode to the SPCCI combustion.

On the other hand, at step S107, the ECU 10 sets the combustion mode to the SI combustion.

Referring again to FIG. 12, after the ECU 10 selects the combustion mode at step S10, the ECU 10 then proceeds to step S11 to determine an ignition timing IGT and the injection pattern (i.e., the injection timing) corresponding to the determined combustion mode.

Then at step S12, the ECU 10 outputs the control signal to the injector 6. The injector 6 injects fuel based on the determined injection pattern. Moreover, when the ignition is to be performed, the ECU 10 also outputs the control signal to the first spark plug 251 and the second spark plug 252. The first spark plug 251 and the second spark plug 252 ignite the mixture gas. After step S12, the ECU 10 returns to the start of the flowchart.

When the ECU 10 changes the combustion mode according to the demanded engine torque, the ECU 10 can set the timing of fuel injection by the injector 6 in consideration of the response delay of the variable valve operating device. Since the mixture gas combusts in the mode suitable for the state inside the cylinder 11, the combustion stability can meet the standard, and abnormal combustion can be reduced.

(Conclusion)

Therefore, in this embodiment, the engine system includes the injector 6 attached to the engine and configured to inject fuel into the cylinder 11, the first and second spark plugs 251 and 252 attached to the engine 1 and configured to ignite the mixture gas of fuel and intake air containing fresh air and burnt gas, the variable valve operating device (the intake S-VT 231, the intake CVVL 232, the exhaust S-VT 241, and the exhaust VVL 242) connected to the intake valve 21 and the exhaust valve 22, and configured to control the opening and closing of the intake valve 21 and the exhaust valve 22 to adjust the filling amount of intake air, and the ECU 10 electrically connected to the injector 6, the first and second spark plugs 251 and 252, and the variable valve operating device (231, 232, 241, and 242), and configured to control the injector 6, the first and second spark plugs 251 and 252, and the variable valve operating device (231, 232, 241, and 242) according to the demanded engine load.

When the engine 1 operates at the given speed and the demanded engine load is the first load or the second load higher than the first load, the ECU 10 controls the injector 6 and the first and second spark plugs 251 and 252 so that the mixture gas inside the cylinder 11 combusts by compression ignition. Moreover, the ECU 10 estimates the temperature $T_{IVC}$ which is the temperature inside the cylinder 11 at the close timing of the intake valve 21 (intake-valve-closing temperature). While the engine 1 operates at the given speed and the demanded engine load is the first load, when the in-cylinder temperature $T_{IVC}$ is above the first temperature, the ECU 10 controls the injector 6 and the first and second spark plugs 251 and 252 so that the entire mixture gas inside the cylinder 11 combusts by compression ignition. On the other hand, when the in-cylinder temperature $T_{IVC}$ is below the first temperature, the ECU 10 controls the injector 6 and the first and second spark plugs 251 and 252 so that at least part of the mixture gas inside the cylinder 11 combusts by flame propagation.

Furthermore, while the engine 1 operates at the given speed and the demanded engine load is the second load, when the in-cylinder temperature $T_{IVC}$ is above the second temperature lower than the first temperature, the ECU 10 controls the injector 6 and the first and second spark plugs 251 and 252 so that the entire mixture gas inside the cylinder 11 combusts by compression ignition. On the other hand, when the in-cylinder temperature $T_{IVC}$ is below the second temperature, the ECU 10 controls the injector 6 and the first and second spark plugs 251 and 252 so that at least part of the mixture gas inside the cylinder 11 combusts by flame propagation. According to this, the timing at which the injector 6 injects fuel can be set in consideration of the response delay of the variable valve operating device. Since the mixture gas combusts in the mode suitable for the state inside the cylinder 11, the combustion stability can meet the standard, and abnormal combustion can be reduced. Particularly, when the engine load is high and the fuel concentration inside the cylinder 11 is high, the in-cylinder temperature $T_{IVC}$ for the switching of the combustion mode decreases, and therefore, the combustion mode can be promptly switched to the mode where the entire mixture gas combusts by the CI combustion. As a result, the thermal efficiency of the engine 1 can promptly be improved, which improves the fuel efficiency. Therefore, the improvement in both of the fuel efficiency and combustion stability can be achieved.

Moreover, in this embodiment, while the engine 1 operates at the given speed and the demanded engine load is the first load, when the in-cylinder temperature $T_{IVC}$ is below the first temperature, the ECU 10 actuates the first and second spark plugs 251 and 252 so that the mixture gas inside the cylinder 11 combusts by the SPCCI combustion. Therefore, even when the in-cylinder temperature $T_{IVC}$ is significantly low, the compression ignition can be performed by executing the SPCCI combustion. Moreover, when the in-cylinder temperature $T_{IVC}$ is increased by the SPCCI combustion, the combustion mode can be switched to the MPCI combustion or the HCCI combustion so that the entire mixture gas inside the cylinder 11 combusts by compression ignition. As a result, the fuel efficiency can be improved while combustion stability is improved.

Moreover, in this embodiment, while the engine 1 operates at the given speed and the demanded load is at the first load which is relatively low, when in-cylinder temperature $T_{IVC}$ is relatively low, the ECU 10 executes the MPCI combustion, and when the in-cylinder temperature $T_{IVC}$ is relatively high, the ECU 10 executes the HCCI combustion. Since the MPCI combustion can be stabilized even when the in-cylinder temperature $T_{IVC}$ is slightly low, the configuration as described above can further improve combustion stability of the CI combustion.

OTHER EMBODIMENTS

The present disclosure is not limited to the embodiment described above, but may be substituted without departing from the spirit and scope of the appended claims.

In the embodiment described above, the switching temperature for the switching of the combustion mode is set based on the G/F and the demanded load, and then, the combustion mode is selected. However, it is not limited to the configuration, but the combustion mode may be determined based on the G/F, the demanded load, and the in-cylinder temperature $T_{IVC}$ in accordance with a map as illustrated in FIG. 10.

The embodiment described above is merely illustration, and the scope of the present disclosure shall not be interpreted restrictively. The scope of the present disclosure is defined by the appended claims, and all modifications and changes within the scope of equivalents of the clams are intended to be embraced in the present disclosure.

The present disclosure is useful for an engine system provided with an engine having a cylinder and a piston which is reciprocatably accommodated in the cylinder, capable of improving fuel efficiency and combustion stability.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
3 Piston
6 Injector
10 ECU (Controller)
11 Cylinder
21 Intake Valve
22 Exhaust Valve
31 Cavity
231 Intake S-VT (Variable Valve Operating Device)
232 Intake CVVL (Variable Valve Operating Device)
241 Exhaust S-VT (Variable Valve Operating Device)
242 Exhaust VVL (Variable Valve Operating Device)
251 First Spark Plug
252 Second Spark Plug

What is claimed is:

1. An engine system including an engine having a cylinder and a piston reciprocatably accommodated in the cylinder, comprising:
an injector attached to the engine and configured to inject fuel into the cylinder;
a spark plug attached to the engine and configured to ignite a mixture gas of fuel and intake air, the intake air containing fresh air and burnt gas;
a variable valve operating device connected to an intake valve and an exhaust valve, and configured to control opening and closing of the intake valve and the exhaust valve to adjust a filling amount of the intake air; and
a controller electrically connected to the injector, the spark plug, and the variable valve operating device, and configured to control the injector, the spark plug, and the variable valve operating device according to a demanded load of the engine,
wherein when the engine operates at a given speed and the demanded engine load is a first load or a second load higher than the first load, the controller controls the injector and the spark plug so that the mixture gas inside the cylinder combusts by compression ignition,
wherein the controller estimates an intake-valve-closing temperature that is the temperature inside the cylinder at a close timing of the intake valve, wherein while the engine operates at the given speed and the demanded engine load is the first load, when the intake-valve-closing temperature is above a first temperature, the controller controls the injector and the spark plug so that the entire mixture gas inside the cylinder combusts by compression ignition, and when the intake-valve-closing temperature is below the first temperature, the controller controls the injector and the spark plug so that at least part of the mixture gas inside the cylinder combusts by flame propagation, wherein while the engine operates at the given speed and the demanded engine load is the second load, when the intake-valve-closing temperature is above a second temperature lower than the first temperature, the controller controls the injector and the spark plug so that the entire mixture gas inside the cylinder combusts by compression ignition, and when the intake-valve-closing temperature is below the second temperature, the controller controls the injector and the spark plug so that at least part of the mixture gas inside the cylinder combusts by flame propagation, wherein a valve lift of the exhaust valve includes a lift curve for the flame propagation combustion and a lift curve for the compression ignition combustion and is switchable therebetween, and wherein in the lift curve for the compression ignition combustion, after the exhaust valve opens during an exhaust stroke and a lift amount of the exhaust valve gradually decreases after the maximum lift, the exhaust valve maintains a given lift amount until the exhaust valve closes at a given timing during an intake stroke after an intake top dead center.

2. The engine system of claim 1, wherein while the engine operates at the given speed and the demanded engine load is the first load, when the intake-valve-closing temperature is below the first temperature, the controller actuates the spark plug so that at least part of the mixture gas inside the cylinder combusts by flame propagation, and the remaining mixture gas combusts by compression ignition.

3. The engine system of claim 2,
wherein while the engine operates at the given speed and the demanded engine load is the first load, when the intake-valve-closing temperature is above the first temperature, the combustion mode includes:
a first compression ignition combustion mode in which the controller controls the injector to make an injection center of gravity be at a first timing, and inhibits the operation of the spark plug so that the entire mixture gas inside the cylinder combusts by compression ignition, the injection center of gravity being defined based on an injection timing and an injection amount of fuel in one cycle; and
a second compression ignition combustion mode in which the controller controls the injector to make the injection center of gravity be at a second timing later than the first timing, and the controller inhibits the operation of the spark plug so that the entire mixture gas inside the cylinder combusts by compression ignition, and
wherein while the engine operates at the given speed and the demanded engine load is the first load, when the intake-valve-closing temperature is above a third temperature higher than the first temperature, the controller executes the first compression ignition combustion mode, and when the intake-valve-closing temperature is higher than the first temperature and lower than the third temperature, the controller executes the second compression ignition combustion mode.

4. The engine system of claim 1,
wherein while the engine operates at the given speed and the demanded engine load is the first load, when the intake-valve-closing temperature is above the first temperature, the combustion mode includes:
a first compression ignition combustion mode in which the controller controls the injector to make an injection center of gravity be at a first timing, and inhibits the operation of the spark plug so that the entire mixture gas inside the cylinder combusts by compression ignition, the injection center of gravity being defined based on an injection timing and an injection amount of fuel in one cycle; and
a second compression ignition combustion mode in which the controller controls the injector to make the injection center of gravity be at a second timing later than the first timing, and the controller inhibits the operation of the spark plug so that the entire mixture gas inside the cylinder combusts by compression ignition, and
wherein while the engine operates at the given speed and the demanded engine load is the first load, when the intake-valve-closing temperature is above a third temperature higher than the first temperature, the controller executes the first compression ignition combustion mode, and when the intake-valve-closing temperature is higher than the first temperature and lower than the third temperature, the controller executes the second compression ignition combustion mode.

5. An engine system including an engine having a cylinder and a piston reciprocatably accommodated in the cylinder, comprising:
an injector attached to the engine and configured to inject fuel into the cylinder;
a spark plug attached to the engine and configured to ignite a mixture gas of fuel and intake air, the intake air containing fresh air and burnt gas;
a variable valve operating device connected to an intake valve and an exhaust valve, and configured to control opening and closing of the intake valve and the exhaust valve to adjust a filling amount of the intake air; and
a controller electrically connected to the injector, the spark plug, and the variable valve operating device, and configured to control the injector, the spark plug, and the variable valve operating device according to a demanded load of the engine,
wherein when the engine operates at a given speed and the demanded engine load is a first load or a second load higher than the first load, the controller controls the injector and the spark plug so that the mixture gas inside the cylinder combusts by compression ignition,
wherein the controller estimates an intake-valve-closing temperature that is the temperature inside the cylinder at a close timing of the intake valve,
wherein while the engine operates at the given speed and the demanded engine load is the first load, when the intake-valve-closing temperature is above a first temperature, the controller controls the injector and the spark plug so that the entire mixture gas inside the cylinder combusts by compression ignition, and when the intake-valve-closing temperature is below the first temperature, the controller controls the injector and the spark plug so that at least part of the mixture gas inside the cylinder combusts by flame propagation, wherein while the engine operates at the given speed and the demanded engine load is the second load, when the intake-valve-closing temperature is above a second temperature lower than the first temperature, the controller controls the injector and the spark plug so that the entire mixture gas inside the cylinder combusts by compression ignition, and when the intake-valve-closing temperature is below the second temperature, the controller controls the injector and the spark plug so that at least part of the mixture gas inside the cylinder combusts by flame propagation, wherein the variable valve operating device includes an exhaust variable valve lift having a first cam, a second cam, and a switching mechanism between the first cam and the second cam, and wherein the first cam opens and closes the exhaust valve during an exhaust stroke, and the second cam opens and closes the exhaust valve during the exhaust stroke and again opens and closes during an intake stroke.

6. The engine system of claim 5, wherein while the engine operates at the given speed and the demanded engine load is the first load, when the intake-valve-closing temperature is below the first temperature, the controller actuates the spark plug so that part of the mixture gas inside the cylinder combusts by flame propagation, and the remaining mixture gas combusts by compression ignition.

7. The engine system of claim 6, wherein while the engine operates at the given speed and the demanded engine load is the first load, when the intake-valve-closing temperature is above the first temperature, the combustion mode includes:

a first compression ignition combustion mode in which the controller controls the injector to make an injection center of gravity be at a first timing, and inhibits the operation of the spark plug so that the entire mixture gas inside the cylinder combusts by compression ignition, the injection center of gravity being defined based on an injection timing and an injection amount of fuel in one cycle; and a second compression ignition combustion mode in which the controller controls the injector to make the injection center of gravity be at a second timing later than the first timing, and the controller inhibits the operation of the spark plug so that the entire mixture gas inside the cylinder combusts by compression ignition, and wherein while the engine operates at the given speed and the demanded engine load is the first load, when the intake-valve-closing temperature is above a third temperature higher than the first temperature, the controller executes the first compression ignition combustion mode, and when the intake-valve-closing temperature is higher than the first temperature and lower than the third temperature, the controller executes the second compression ignition combustion mode.

8. The engine system of claim 5, wherein while the engine operates at the given speed and the demanded engine load is the first load, when the intake-valve-closing temperature is above the first temperature, the combustion mode includes:

a first compression ignition combustion mode in which the controller controls the injector to make an injection center of gravity be at a first timing, and inhibits the operation of the spark plug so that the entire mixture gas inside the cylinder combusts by compression ignition, the injection center of gravity being defined based on an injection timing and an injection amount of fuel in one cycle; and a second compression ignition combustion mode in which the controller controls the injector to make the injection center of gravity be at a second timing later than the first timing, and the controller inhibits the operation of the spark plug so that the entire mixture gas inside the cylinder combusts by compression ignition, and wherein while the engine operates at the given speed and the demanded engine load is the first load, when the intake-valve-closing temperature is above a third temperature higher than the first temperature, the controller executes the first compression ignition combustion mode, and when the intake-valve-closing temperature is higher than the first temperature and lower than the third temperature, the controller executes the second compression ignition combustion mode.

* * * * *